(12) United States Patent
Someya et al.

(10) Patent No.: US 6,724,398 B2
(45) Date of Patent: Apr. 20, 2004

(54) IMAGE PROCESSING METHOD AND APPARATUS, AND IMAGE DISPLAY METHOD AND APPARATUS, WITH VARIABLE INTERPOLATION SPACING

(75) Inventors: Jun Someya, Tokyo (JP); Masaki Yamakawa, Tokyo (JP); Yoshiaki Okuno, Tokyo (JP); Hideki Yoshii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/883,940

(22) Filed: Jun. 20, 2001

(65) Prior Publication Data

US 2002/0030690 A1 Mar. 14, 2002

(30) Foreign Application Priority Data

| Jun. 20, 2000 | (JP) | 2000-184816 |
| Nov. 21, 2000 | (JP) | 2000-354226 |
| Jan. 23, 2001 | (JP) | 2001-015002 |
| Mar. 6, 2001 | (JP) | 2001-061436 |

(51) Int. Cl.$^7$ ................................ G09G 5/10
(52) U.S. Cl. ........................ 345/690; 345/698
(58) Field of Search .................... 345/690, 694, 345/698, 660, 670, 671, 672, 673, 589, 611; 382/298, 299

(56) References Cited

U.S. PATENT DOCUMENTS 6,002,810 A * 12/1999 Wakisawa et al. .......... 382/298

FOREIGN PATENT DOCUMENTS

| JP | 9266531 | 10/1997 |
| JP | 2777202 | 5/1998 |

* cited by examiner

Primary Examiner—Xiao Wu
(74) Attorney, Agent, or Firm—Birch, Stewart, Kolasch & Birch, LLP

(57) ABSTRACT

An image is processed by detecting pixel-to-pixel variations in brightness level, generating high spatial frequency information related to the variations, setting interpolation points with a spacing that varies according to the high spatial frequency information, and generating new pixels by interpolation at the interpolation points. By increasing the zoom ratio in one part and reducing the zoom in another part of each edge in a continuous manner, this method can mitigate edge degradation when an image is enlarged or reduced, without introducing discontinuities or other image artifacts. It also provides a convenient way to adjust edge sharpness in an image.

1 Claim, 44 Drawing Sheets

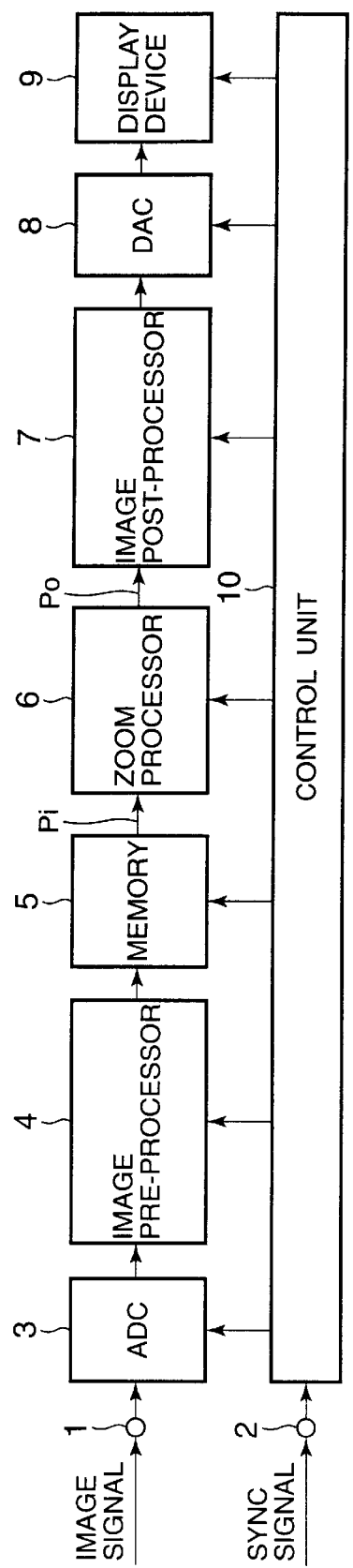

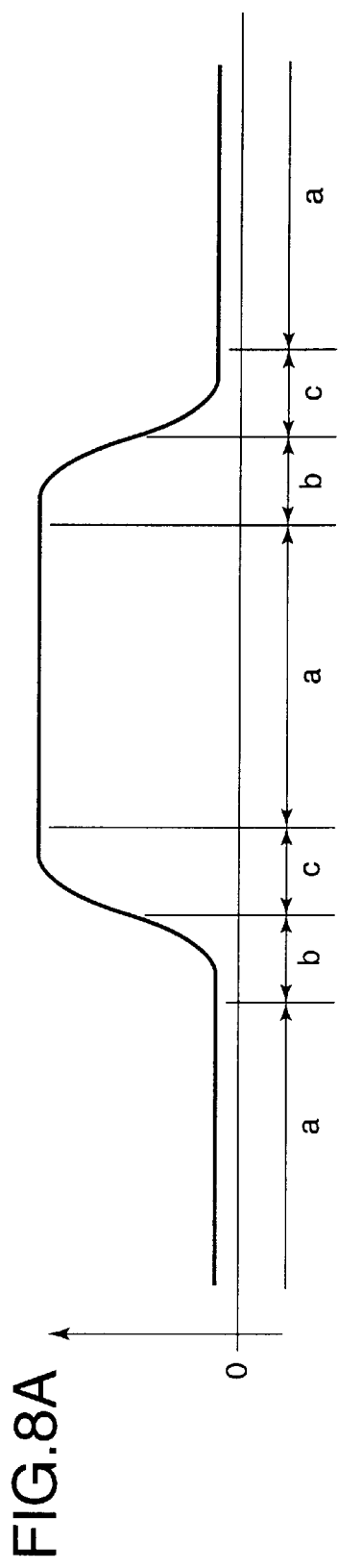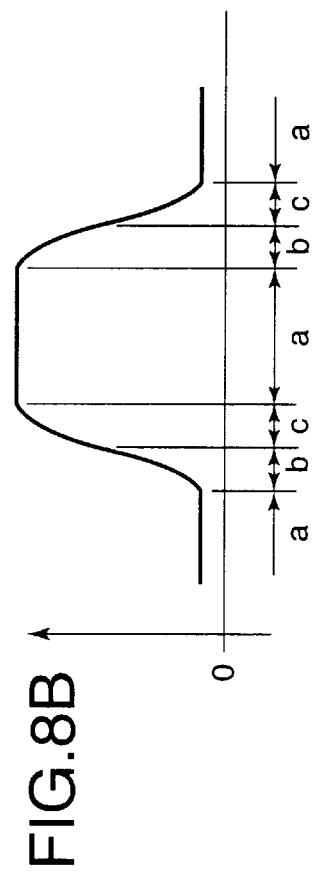
FIG.8A
FIG.8B

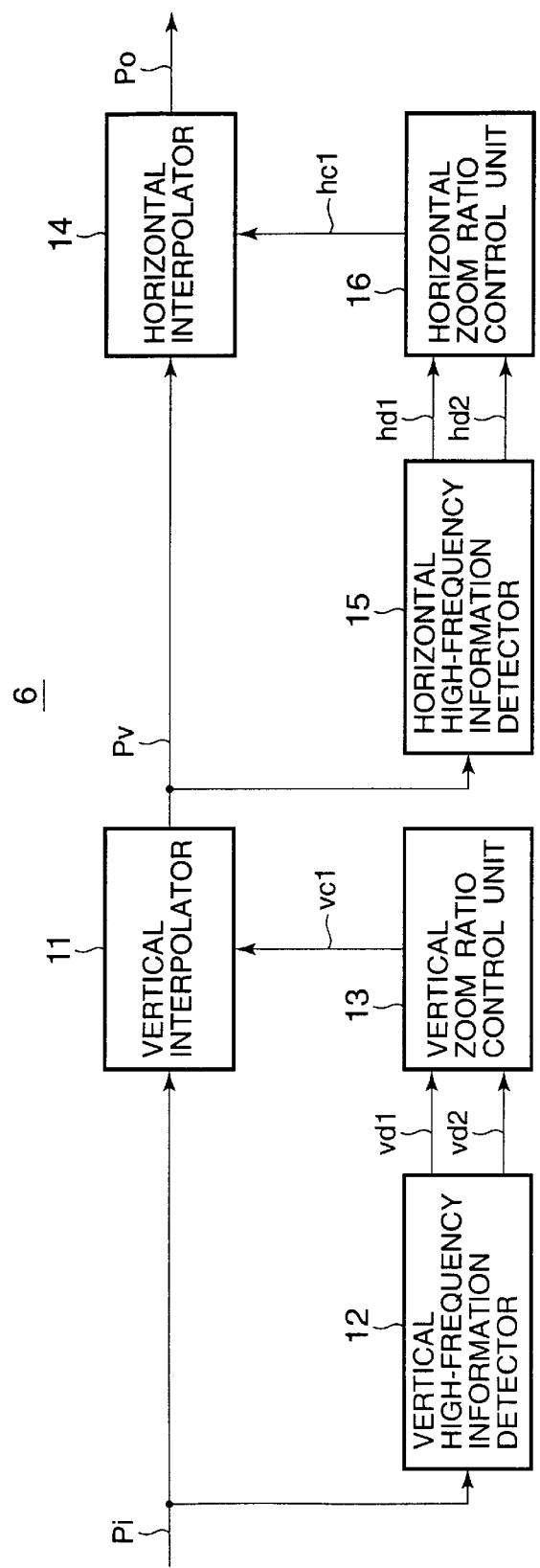

(2+) :  2*(a)+d  <  (b)
(+)  :  (a)+d  <  (b)  ≦  2*(a)+d
(0)  :  (a)−d  ≦  (b)  ≦  (a)+d
(−)  :  0.5*(a)−d  ≦  (b)  <  (a)−d
(2−) :  (b)  <  0.5*(a)−d

IMAGE PROCESSING METHOD AND APPARATUS, AND IMAGE DISPLAY METHOD AND APPARATUS, WITH VARIABLE INTERPOLATION SPACING

BACKGROUND OF THE INVENTION

This invention relates to an image processing method and apparatus and an image display method and apparatus, more particularly to methods and apparatus that are useful for expanding and reducing digitized images, and for controlling edge sharpness.

Digital image expansion and reduction are processes that change the number of picture elements (pixels) in an image. These processes are often necessary. For example, an image generated in the widely used 640-by-480-pixel format may need to be expanded for display on a 1024-by-768-pixel liquid crystal screen, or reduced for display in a window occupying only part of that screen.

FIGS. 1A and 1B illustrate the conventional expansion of an image by a factor of three. The horizontal axis in these drawings represents a horizontal row of pixels in the image; the vertical axis represents the pixel data values, indicating pixel brightness levels. Before expansion, the row of pixels has segments (h) of uniform brightness, separated by edges (j, k) at which the brightness level changes, as shown in FIG. 1A. The conventional expansion process expands all of these segments and edges identically by a factor of three, so that the edges (j1, k1) in the expanded image, shown in FIG. 1B, are not as sharp as the edges in the original image.

The pixel values in the expanded picture are determined by interpolation, which is performed by a spatial filtering operation as illustrated in FIG. 2. The horizontal axis again represents horizontal position; the vertical axis now represents the value of an interpolation filter response characteristic F(x). If p(n) and p(n+1) are two consecutive pixels in the input image, q(n) is a pixel disposed at a position between them in the output image, the distance from p(n) to p(n+1) is equal to unity, and the distance from p(n) to q(m) is equal to r, then the brightness level of pixel q(m) is calculated as follows:

$$q(m)=(F(r)\times p(n))+(F(1-r)\times p(n+1))$$

FIG. 3 illustrates schematically how this filtering calculation generates seven output pixels (q1 to q7) from three input pixels (p1 to p3).

The filter response characteristic need not be linear. An interpolation filter with a nonlinear characteristic, as illustrated in FIG. 4, is sometimes used to enhance the sharpness of edges (e.g., j1 and k1) in the output image. This type of edge enhancement, however, leads to further problems such as undershoot (pre-shoot) and overshoot.

Japanese Unexamined Patent Application No. 9-266531 discloses a scheme that provides several filter response characteristics, as illustrated in FIGS. 5A, 5B, and 5C, and switches among them according to the type of image area being processed. When this filter-switching scheme is used, however, there are problems of discontinuities at the points at which switching takes place.

Problems also occur when an image is reduced by conventional methods. The quality of edges is degraded because of pixel dropout.

SUMMARY OF THE INVENTION

One object of this invention is to mitigate edge degradation when an image is expanded or reduced.

Another object is to control edge sharpness in an image.

The invention provides a method of processing an image, formed from input pixels, by the following steps:

(a) detecting pixel-to-pixel variations in the brightness levels of the input pixels in at least one direction in the image, thereby generating high spatial frequency information;

(b) setting interpolation points with a spacing that varies according to the high spatial frequency information; and (c) generating output pixels from the input pixels by interpolation at the interpolation points.

Step (b) preferably assigns a basic value to the spacing of the interpolation points in parts of the image in which the brightness level is uniform. As for portions of the image in which the brightness level varies, step (b) may divide each such portion into a first part and a second part, reduce the interpolation spacing in the first part, and increase the interpolation spacing in the second part. Alternatively, step (b) may divide each such portion into a first part, a second part, and a third part, reduce the interpolation spacing in the first and third parts, and increase the interpolation spacing in the second part.

Step (a) includes, for example, calculating a first derivative of the brightness levels in the above-mentioned one direction. Step (a) may also include calculating a second or third derivative of the brightness levels, or performing a filtering operation to obtain a certain spatial frequency component of the image, by performing two low-pass filtering operations with different cut-off frequencies and taking the difference between the resulting two low spatial frequency components, for example.

Alternatively, step (a) may include detecting patterns of variation in the brightness levels of the input pixels. The detected patterns describe, for example, the polarity of pixel-to-pixel changes in brightness level, or the polarity and magnitude of the changes. The changes thus described may be, for example, changes in the brightness levels of three consecutive pixels, or changes in the brightness levels of five consecutive pixels.

The invention also provides a machine-readable medium storing a machine-executable program for processing an image by the invented method.

The invention moreover provides an image-processing apparatus for processing an image formed from input pixels. The apparatus includes a first processing unit that detects pixel-to-pixel variations in the brightness levels of the input pixels in at least one direction in the image, and generates high spatial frequency information; a second processing unit that sets interpolation points with a spacing varying according to the high spatial frequency information; and a third processing unit that generates output pixels from the input pixels by interpolation at the interpolation points.

The second processing unit preferably assigns a basic value to the interpolation spacing in parts of the image in which the brightness level is uniform. In processing portions of the image in which the brightness level changes, the second processing unit may divide each such portion into a first part and a second part, reduce the interpolation spacing in the first part, and increase the interpolation spacing in the second part. Alternatively, it may divide each such portion into a first part, a second part, and a third part, reduce the interpolation spacing in the first and third parts, and increase the interpolation spacing in the second part.

As high spatial frequency information, the first processing unit may calculate a first derivative of the brightness levels in the above-mentioned one direction. The first processing unit may also calculate a second or third derivative of the brightness levels, or perform a filtering operation to obtain a certain spatial frequency component of the image, by performing two low-pass filtering operations with different cut-off frequencies and taking the difference between the resulting two low spatial frequency components, for example.

Alternatively, the first processing unit may detect patterns of variation in the brightness levels of the input pixels. The detected patterns describe, for example, the polarity of pixel-to-pixel changes in brightness level, or the polarity and magnitude of the changes. The changes thus described may be, for example, changes in the brightness levels of three consecutive pixels, or changes in the brightness levels of five consecutive pixels.

The invention furthermore provides an image display apparatus for displaying an image formed from input pixels. The image display apparatus includes a memory unit that stores the brightness levels of the input pixels; a first processing unit that detects pixel-to-pixel variations in the brightness levels in at least one direction in the image, thereby generating high spatial frequency information; a second processing unit that sets interpolation points with a spacing that varies according to the high spatial frequency information; a third processing unit that generates output pixels from the input pixels by interpolation at the interpolation points; and a display unit that displays the output pixels.

The second processing unit preferably assigns a basic value to the interpolation spacing in parts of the image in which the brightness level is uniform. In processing portions of the image in which the brightness level changes, the second processing unit may divide each such portion into a first part and a second part, reduce the interpolation spacing in the first part, and increase the interpolation spacing in the second part. Alternatively, it may divide each such portion into a first part, a second part, and a third part, reduce the interpolation spacing in the first and third parts, and increase the interpolation spacing in the second part.

As high spatial frequency information, the first processing unit may calculate a first derivative of the brightness levels in the above-mentioned one direction. The first processing unit may also calculate a second or third derivative of the brightness levels, or perform a filtering operation to obtain a certain spatial frequency component of the image, by performing two low-pass filtering operations with different cut-off frequencies and taking the difference between the resulting two low spatial frequency components, for example.

Alternatively, the first processing unit may detect patterns of variation in the brightness levels of the input pixels. The detected patterns describe, for example, the polarity of pixel-to-pixel changes in brightness level, or the polarity and magnitude of the changes. The changes thus described may be, for example, changes in the brightness levels of three consecutive pixels, or changes in the brightness levels of five consecutive pixels.

Varying the spacing of the interpolation points provides a way to control edge sharpness without introducing discontinuities or other unwanted image artifacts.

Increasing the interpolation spacing mitigates the loss of edge sharpness that occurs when an image is expanded.

Decreasing the interpolation spacing mitigates the drop-out problem that occurs when an image is reduced.

Dividing an image portion into multiple parts and increasing the interpolation spacing in at least one part while decreasing the interpolation spacing in another part enables the loss-of-sharpness problem to be mitigated in edge expansion, and the drop-out problem to be mitigated in image reduction, without changing the overall expansion or reduction ratio.

Use of the first, second, and third derivatives as high spatial frequency information enables continuously-varying information to be obtained by simple arithmetic operations. Filtering also enables such information to be obtained by relatively simple arithmetic operations.

Detecting patterns of variation in the brightness levels of the input pixels enables high-frequency information to be generated by simple arithmetic and logic operations. Detecting patterns in the polarity of changes over three consecutive pixels provides adequate continuity, but the continuity can be improved by also detecting the magnitude of the changes, or by detecting patterns over five consecutive pixels.

BRIEF DESCRIPTION OF THE DRAWINGS

In the attached drawings:

FIG. 6 illustrates an image display apparatus embodying the invention;

FIG. 8A illustrates pixel data values in part of an image, with edges divided into leading and trailing parts;

FIG. 8B illustrates corresponding pixel data values after image reduction according to several embodiments of the invention;

FIG. 9 illustrates the internal structure of the zoom processor in FIG. 6 according to a first embodiment of the invention;

DETAILED DESCRIPTION OF THE INVENTION

Figure 1A:
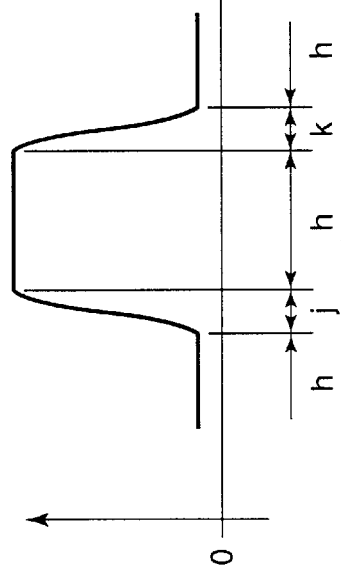
FIG. 1A illustrates pixel data values in part of an image.
Figure 1B:
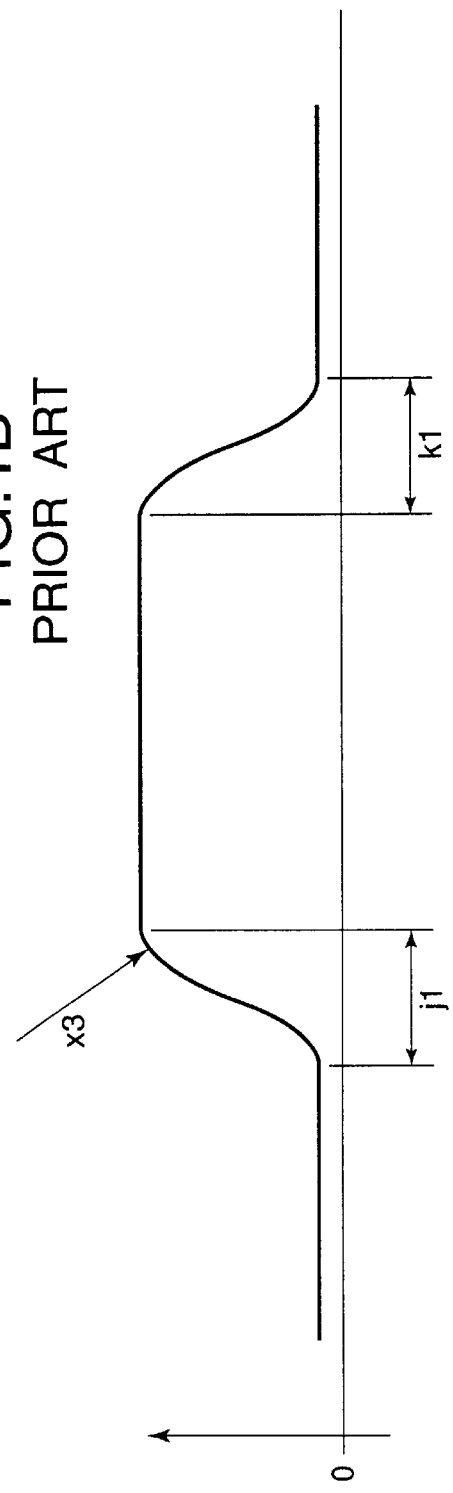
FIG. 1B illustrates corresponding pixel data values in a conventionally expanded image.

Embodiments of the invention will be described with reference to the attached drawings, in which like parts are indicated by like reference characters.

Figure 2:
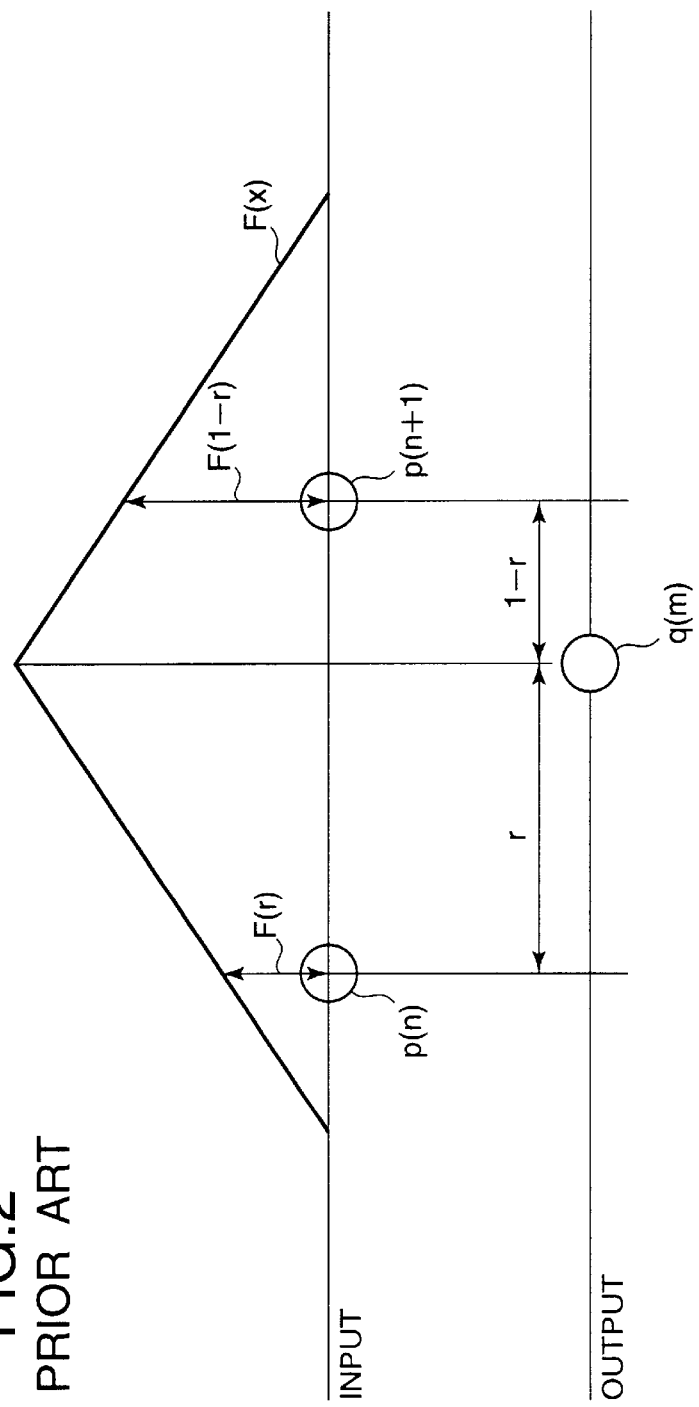
FIG. 2 illustrates an interpolation filter response characteristic.
Figure 3:
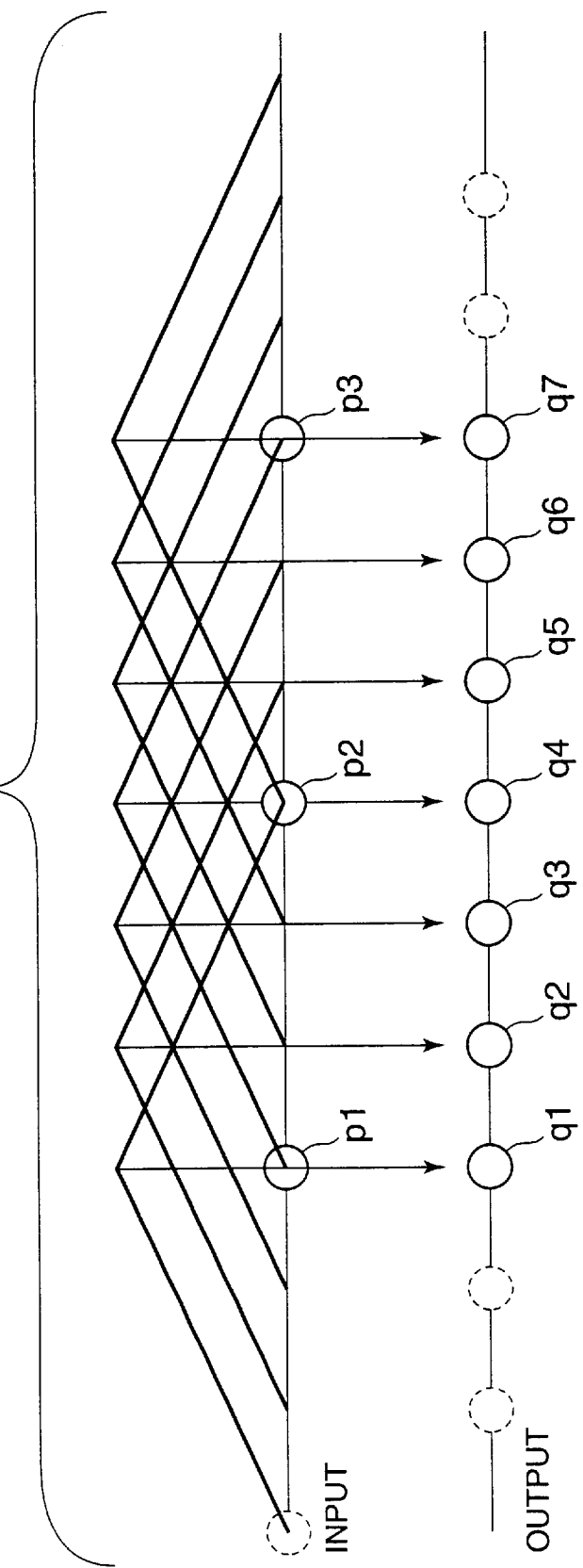
FIG. 3 illustrates the generation of expanded image data by conventional interpolation with the characteristic in FIG. 2.
Figure 4:
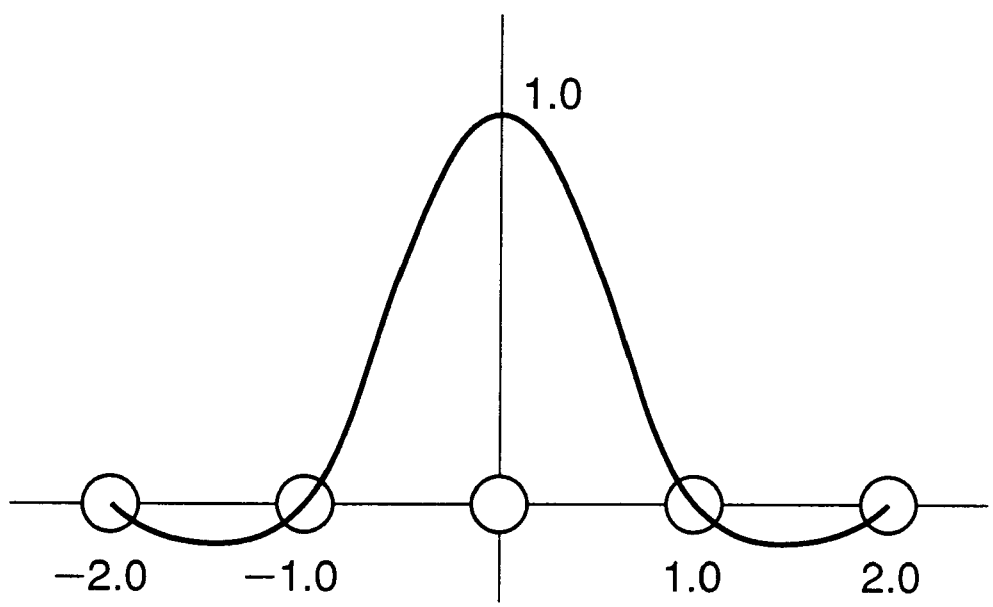
FIG. 4 illustrates a conventional non-linear interpolation filter response characteristic.
Figure 5A:
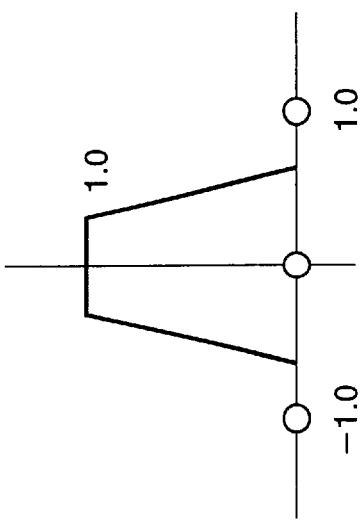
FIGS. 5A, 5B, and 5C illustrate a selection of conventional interpolation filter response characteristics.
Figure 5B:
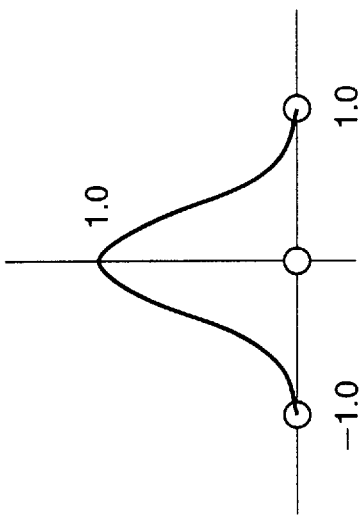
Figure 5C:
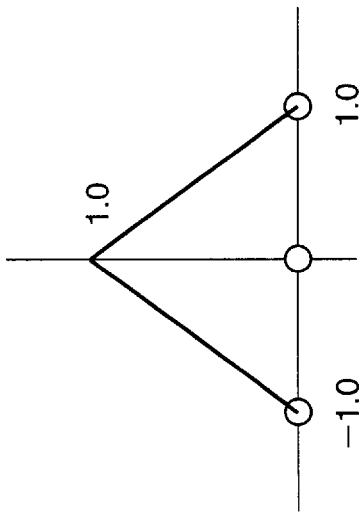

The word 'zoom' will be used below as a generic term denoting any change in the number of pixels representing an image, or part of an image. Zooming may either increase the number of pixels, thereby either expanding the image, or decrease the number of pixels, thereby reducing the image. The ratio of the number of pixels after zooming to the number before zooming will be referred to as the zoom ratio. An image may be zoomed horizontally, vertically, or in both directions. Horizontal zooming is performed by interpolation as illustrated in FIG. 2; vertical zooming is performed by similar interpolation in the vertical direction.

The first ten embodiments relate to the image display apparatus shown in FIG. 6. The apparatus comprises input terminals 1, 2 for an image signal and a synchronization (sync) signal. The image signal passes through, in sequence, an analog-to-digital converter (ADC) 3, an image pre-processor 4, a memory 5, a zoom processor 6, an image post-processor 7, and a digital-to-analog converter (DAC) 8; the processed image is then displayed by a display device 9. The operation of these component elements is controlled by a control unit 10, which receives the synchronization signal.

The input image signal is, for example, a composite video signal with luminance and chrominance components. Alternatively, the luminance and chrominance signals may be input separately, so that the input image signal comprises a pair of separate video input signals. The input image signal may also be a trio of signals for three primary colors (normally red, blue, and green).

The control unit 10 uses the synchronization signal to generate a sampling clock signal for the analog-to-digital converter 3, and to generate clock signals, timing signals, and other control signals for the other component elements.

The analog-to-digital converter 3 samples the input image signal in synchronization with the sampling clock, thereby converting the input image signal to digital data.

The image pre-processor 4 converts the digital data from the input format to the format used by the zoom processor 6, if these formats differ. For example, the image pre-processor 4 may convert a composite video signal to separate luminance and chrominance data, or to separate data for the three primary colors. The image pre-processor 4 may also process the data to adjust the brightness or contrast of the image. The processing performed by the image pre-processor 4 is independent of the zooming process that will be performed by the zoom processor 6.

The memory 5 stores the pre-processed image data temporarily. The data are written into the memory 5 in the usual image scanning sequence, each horizontal line being scanned from left to right, and the scanning lines being taken in order from top to bottom. The memory 5 should have enough capacity to store data for several scanning lines (at least two). Data are read out from the memory 5 at timings determined according to the requirements of the display device 9, not necessarily in synchronization with the sampling clock, and not necessarily in the same order as written. The image data read from the memory 5 become the input data (Pi) of the zoom processor 6.

The zoom processor 6, which constitutes the invented image-processing apparatus, detects brightness-level changes in the input image data Pi, sets interpolation points by calculating zoom ratios, and generates output image data Po by interpolation at the interpolation points, thereby zooming the image. Details will be given in the descriptions of the embodiments below.

The image post-processor 7 further processes the output image data Po by, for example, adjusting the brightness, contrast, or color saturation of the output image, or adjusting the luminance scale. These adjustments are independent of the zooming process.

The digital-to-analog converter 8 converts the post-processed image data to an analog signal or signals. The display device 9 displays the analog signal(s) as an image on a screen, scanning the screen at a rate determined by the control unit 10.

Figure 7A:
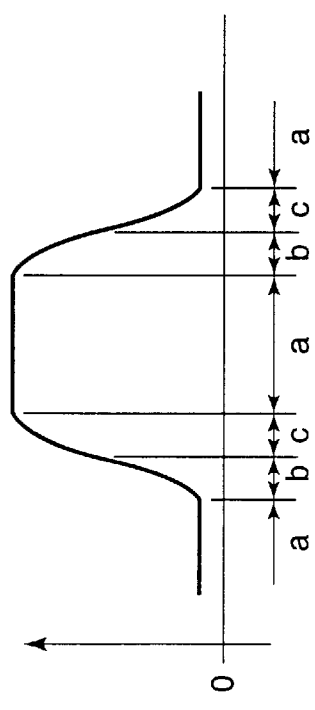
FIG. 7A illustrates pixel data values in part of an image, with edges divided into leading and trailing parts.
Figure 7B:
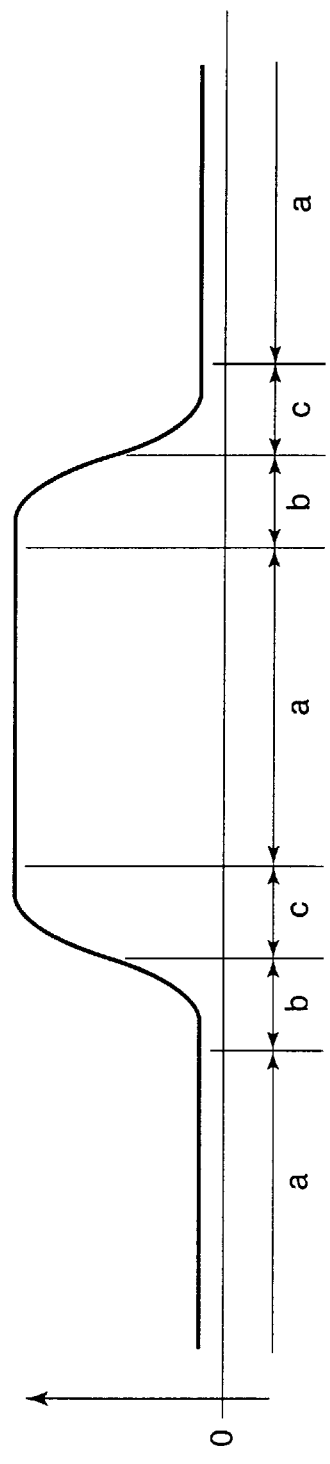
FIG. 7B illustrates corresponding pixel data values after image expansion according to several embodiments of the invention.

FIGS. 7A and 7B illustrate image expansion and FIGS. 8A and 8B illustrate image reduction in the first five embodiments of the invention. The horizontal axis in these drawings could correspond to either the horizontal or the vertical direction in the image. The horizontal direction will be assumed in the following discussion, so the horizontal axis represents a horizontal row of pixels. The vertical axis represents the pixel values, i.e., the pixel brightness levels.

The expansion method used in the first five embodiments can be described generally as follows. The zoom processor 6 detects brightness-level variations in the input row of pixels (FIG. 7A). The information thus obtained divides the row into uniform segments (a), in each of which the brightness level remains uniform, and edges (b, c), at which the brightness level changes. The edges are further divided into first and second parts, more specifically, into leading edge segments (b) and trailing edge segments (c). A basic zoom ratio (n) greater than unity is applied to the uniform segments (a). A variable zoom ratio greater than n is applied in the leading edge segments (b). A variable zoom ratio less than n is applied in the trailing edge segments (c). The image is then expanded by generating new image data (FIG. 7B) according to these zoom ratios.

The basic zoom ratio (n) may have an arbitrary value. A typical value is 1.6, used for converting a 640-by-480-pixel image to a 1024-by-768-pixel image.

The reduction method used in the first five embodiments can be described as follows. The zoom processor 6 again detects brightness-level variations in the input row of pixels (FIG. 8A), dividing the row of pixels into uniform segments (a), leading edge segments (b), and trailing edge segments (c). A basic zoom ratio (n) less than unity is applied in the uniform segments (a). A variable zoom ratio higher than n is applied in the leading edge segments (b). A variable zoom ratio lower than n is applied in the trailing edge segments (c). The image is then reduced by generating new image data (FIG. 8B) according to these zoom ratios.

The internal structure and operation of the zoom processor 6 will now be described. In the descriptions that follow, the zoom processor 6 performs both horizontal and vertical zooming.

Referring to FIG. 9, the zoom processor 6 in the first embodiment includes a vertical interpolator 11, a vertical high-frequency information detector 12, a vertical zoom ratio control unit 13, a horizontal interpolator 14, a horizontal high-frequency information detector 15, and a horizontal zoom ratio control unit 16. These elements comprise, for example, specialized arithmetic and logic circuits, detailed descriptions of which will be omitted to avoid obscuring the invention with unnecessary detail.

The vertical high-frequency information detector 12 receives input image data Pi from the memory 5 and performs operations equivalent to mathematical differentiation, obtaining the first derivative vd1 and second derivative vd2 of the image data in the vertical direction. These derivatives furnish information about comparatively high spatial frequencies in the vertical direction.

The vertical zoom ratio control unit 13 uses the vertical derivatives vd1, vd2 output by the vertical high-frequency information detector 12 to determine a vertical zoom ratio vc1, and supplies this zoom ratio vc1 to the vertical interpolator 11.

The vertical interpolator 11 uses the supplied vertical zoom ratio vc1 to generate vertically zoomed image data Pv from the input data Pi.

The horizontal high-frequency information detector 15 performs horizontal differentiation on the vertically zoomed image data Pv to obtain a horizontal first derivative hd1 and second derivative hd2. These derivatives furnish information about comparatively high spatial frequencies in the horizontal direction.

The horizontal zoom ratio control unit 16 uses the horizontal derivatives hd1, hd2 output by the horizontal high-frequency information detector 15 to determine a horizontal zoom ratio hc1, and supplies this horizontal zoom ratio hc1 to the horizontal interpolator 14.

The horizontal interpolator 14 uses the supplied horizontal zoom ratio hc1 to generate output image data Po from the vertically zoomed image data Pv.

In the zoom processor 6, the vertical high-frequency information detector 12 and horizontal high-frequency information detector 15 function as first processing units, the vertical zoom ratio control unit 13 and horizontal zoom ratio control unit 16 function as second processing units, and the vertical interpolator 11 and horizontal interpolator 14 function as third processing units.

Though not shown in the drawings, it is possible to insert a vertical low-pass spatial filter between the memory 5 and the vertical high-frequency information detector 12, to remove noise from the input image data Pi, so that the noise will not disturb the zoom ratio. If this is done, the vertical low-pass spatial filter and vertical high-frequency information detector 12 together constitute a first processing unit. The vertical interpolator 11 continues to receive the unaltered image data Pi read from the memory 5.

Similarly, a horizontal low-pass spatial filter may be inserted between the vertical interpolator 11 and the horizontal high-frequency information detector 15. In this case the horizontal low-pass spatial filter and the horizontal high-frequency information detector 15 together constitute a first processing unit. The horizontal low-pass spatial filter may be provided in addition to or instead of the vertical low-pass spatial filter.

In place of a low-pass spatial filter, a bandpass spatial filter may be inserted between the memory 5 and vertical high-frequency information detector 12, and/or between the vertical interpolator 11 and horizontal high-frequency information detector 15. Similar noise-reduction effects are obtained.

Alternatively, a coring unit with a dead band may be inserted between the vertical high-frequency information detector 12 and vertical zoom ratio control unit 13, or between the horizontal high-frequency information detector 15 and horizontal zoom ratio control unit 16, to remove information about minor variations that are likely to be due to noise.

The horizontal zooming operation will now be described in more detail.

Figure 10A:
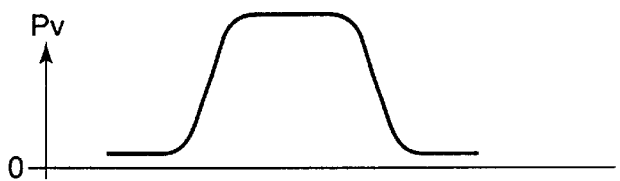
FIGS. 10A, 10B, 10C, 10D, and 10E are spatial waveform diagrams illustrating the operation of the first embodiment.
Figure 10B:
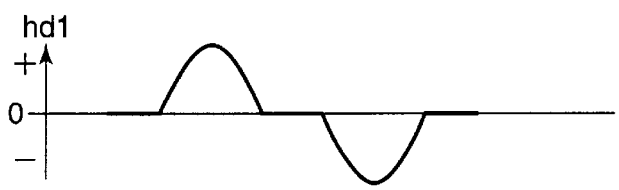
Figure 10C:
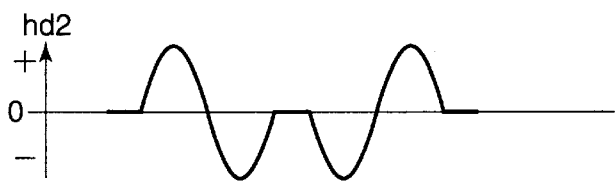

FIG. 10A shows an example of brightness levels in a horizontal line in the image data Pv output by the vertical interpolator 11. FIG. 10B shows the corresponding horizontal first derivative hd1 output by the horizontal high-frequency information detector 15, calculated as, for example, differences in brightness level between mutually adjacent pixels. FIG. 10C shows the corresponding horizontal second derivative hd2 output by the horizontal high-frequency information detector 15. The horizontal zoom ratio control unit 16 calculates the horizontal zoom ratio hc1 by the following equation, in which n is the basic zoom-ratio parameter mentioned earlier, and k is an arbitrary positive constant parameter.

$$hc1 = n + (k \times hd1 \times hd2)$$

Figure 10D:
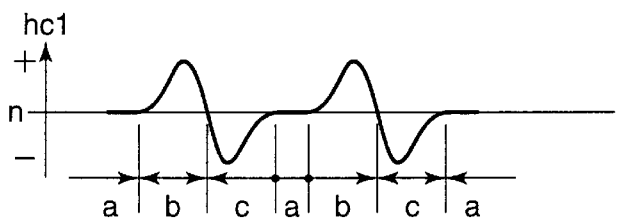

The variable zoom ratio (hc1) obtained with this equation is shown in FIG. 10D. As already noted, the zoom ratio hc1 is equal to n in the segments (a) of uniform brightness level, is greater than n in the leading edge segments (b), and is less than n in the trailing edge segments (c). The average value of hc1 over the entire horizontal line is equal to n. If AVE(x) indicates the average value of x over one horizontal line, then:

$$AVE(hc1) = n$$

Figure 10E:
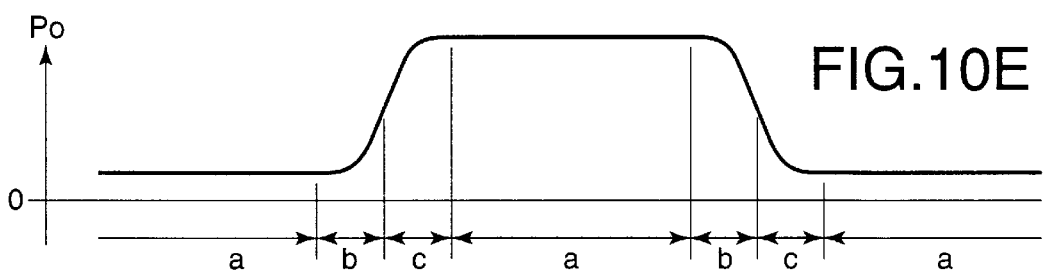

FIG. 10E depicts expanded image data Po obtained by interpolation with this varying horizontal zoom ratio hc1.

Similar operations are performed in the vertical direction to generate a varying vertical zoom ratio vc1. The average of this varying vertical zoom ratio vc1 is again equal to n.

Figure 11:
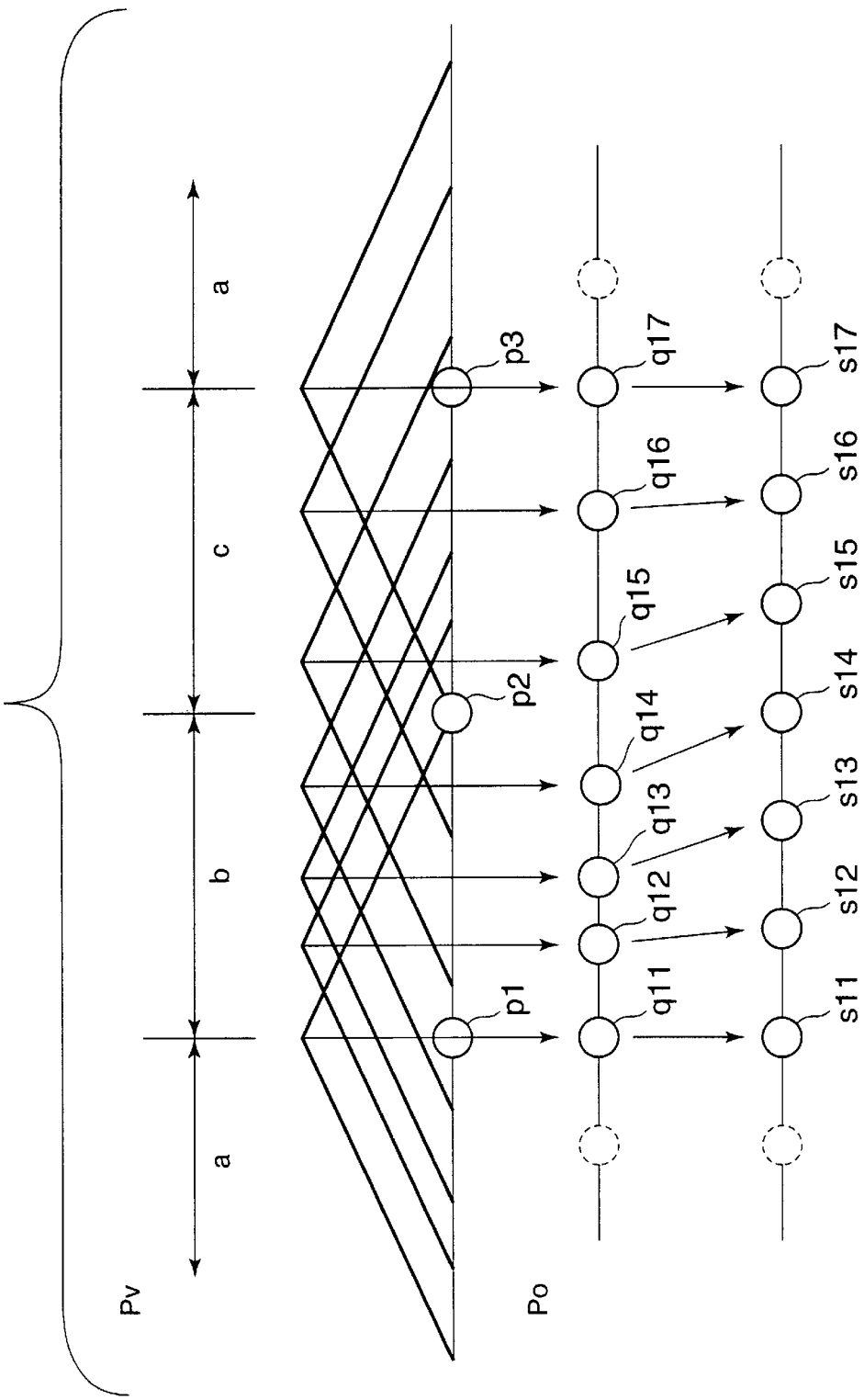
FIG. 11 illustrates interpolation in the first embodiment at a three-pixel edge.

FIG. 11 illustrates the generation of output image data at an edge comprising three pixels (p1, p2, p3) in the image data Pv, when the basic zoom ratio (n) applied in uniform segments (a) is three. Output pixels are generated by interpolation at seven points (q11 to q17) using the type of linear filter response characteristic illustrated in FIG. 2. If the distance between p1 and p2 is taken to be unity, then the zoom ratio hc1 is the reciprocal of the spacing between adjacent interpolation points. This spacing can be seen to vary according to the curve in FIG. 10D, becoming shortest between q12 and q13, where the zoom ratio is highest, and longest between q15 and q16, where the zoom ratio is lowest.

Approximately speaking, the distance between points q11 and q12 is the reciprocal of the zoom ratio at q12, the distance between q12 and q13 is the reciprocal of the zoom ratio at q13, and so on. New pixels can thus be generated at points given by the cumulative sum of the reciprocals of the zoom ratios. Specifically, the horizontal zoom ratio control unit 16 calculates the zoom ratio hc1 at the conventional evenly-spaced interpolation points (not visible), and the reciprocals (1/hc1) of the calculated hc1 values are cumulatively summed to set the interpolation points (q11 to q17) at which new pixels are actually generated. This process will be illustrated in the eighth embodiment.

Thus by calculating a variable zoom ratio hc1, the horizontal zoom ratio control unit 16 sets interpolation points (e.g., q11 to q17) with variable spacing in each horizontal line. A basic spacing value (1/n) is used in uniform segments (a). The spacing is decreased in leading edge segments (b), and increased in trailing edge segments (c).

The interpolation points given as cumulative sums of the 1/hc1 values determine the filter coefficients used to generate the output pixel values, and determine the vertically zoomed pixels (p1, p2, etc.) to which the filter coefficients are applied. If the vertically zoomed pixels (p1, p2, etc.) are stored in the memory 5, the horizontal interpolator 14 converts the cumulative sums of 1/hc1 to addresses in the memory 5.

The filter coefficients may be pre-calculated and stored in a look-up table in the memory 5 (or another memory unit, not shown in the drawings). In that case, the horizontal interpolator 14 also converts the cumulative sums of the 1/hc1 to addresses in the look-up table.

When the output image is displayed, the interpolated pixels are evenly spaced, as indicated by s11 to s17 at the bottom of FIG. 11. Thus the leading edge segment (b), which has a zoom ratio higher than n, is expanded into a wider segment than the trailing edge segment (c), which has a zoom ratio lower than n. As a result, the variation in brightness level is not distributed evenly from pixel s11 to s17 in the expanded edge; most of the variation occurs in the trailing half of the expanded edge, from pixel s14 to pixel s17. The expanded edge thus appears sharper than it would appear if it had been expanded by the conventional uniform zoom ratio.

When an image is reduced, conversely, trailing edge segments are reduced by more than the basic zoom ratio, and leading edge segments are reduced by less than the basic zoom ratio. The conventional problem of pixel dropout is therefore mitigated in the leading edge segments, in which the number of pixels is not reduced so much.

Compared with conventional methods, the first embodiment is accordingly able to expand and reduce images by arbitrary zoom ratios with less noticeable loss of edge sharpness when an image is expanded, and less noticeable pixel drop-out when an image is reduced, and without producing noticeable discontinuities, since the interpolation spacing varies in a continuous manner.

The parameter k employed in calculating the variable zoom ratio hc1 can be used to control edge sharpness in the output image, larger values of k leading to sharper edges. This technique can be used to control edge sharpness even when the basic zoom ratio (n) is unity, so that the image as a whole is not expanded or reduced.

The parameters (n, k) used for horizontal zooming need not be the same as the parameters (n, k) used for vertical zooming. For example, the basic zoom-ratio parameter can be set to two (n=2) vertically and one (n=1) horizontally to convert from interlaced to progressive scanning by interpolating new scanning lines, with independent control of edge sharpness in the vertical and horizontal directions.

The variable zoom ratio can be calculated by more complex schemes than simply adding the product of the first derivative, the second derivative, and the parameter k to the basic zoom ratio n. For example, a positive upper limit and a negative lower limit may be placed on the product, or a non-linear function may be applied as a substitute for multiplication by k.

Similarly, the filter response characteristic may be non-linear, instead of linear as shown in FIG. 11.

FIG. 9 showed vertical zooming being performed before horizontal zooming, but horizontal zooming may be performed before vertical zooming.

Figure 12:
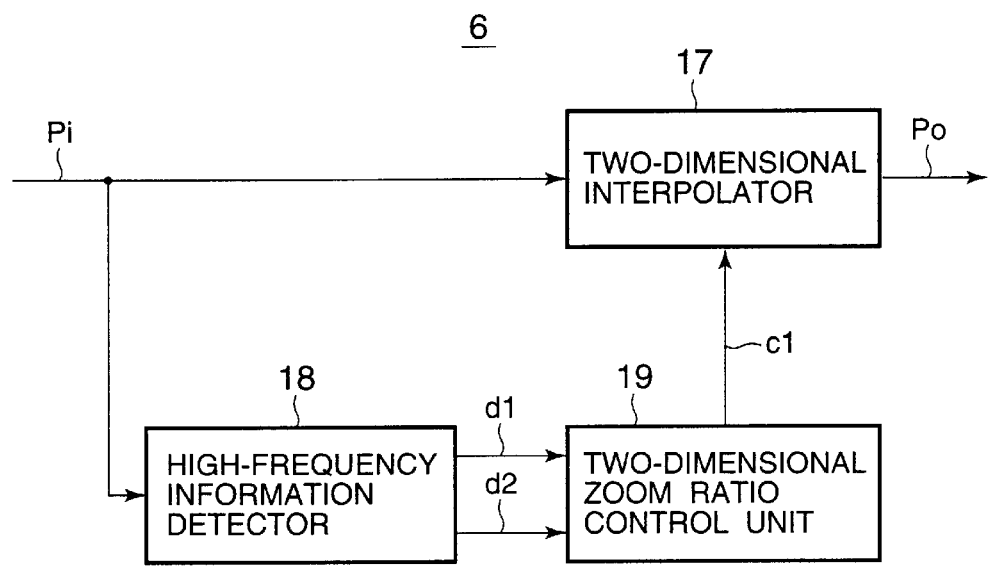
FIG. 12 illustrates the internal structure of the zoom processor in a variation of the first embodiment.

Referring to FIG. 12, horizontal zooming and vertical zooming may be carried out simultaneously. The zoom processor 6 then comprises a two-dimensional interpolator 17, a high-frequency information detector 18, and a two-dimensional zoom ratio control unit 19. The high-frequency information detector 18 detects both horizontal and vertical variations in the input image data and calculates a two-dimensional first derivative d1 and second derivative d2. The two-dimensional zoom ratio control unit 19 calculates a two-dimensional zoom ratio c1 from these derivatives d1 and d2, by a two-dimensional version of the calculation described above. The two-dimensional interpolator 17 uses the two-dimensional zoom ratio c1 and the input image data Pi for two-dimensional interpolation, thereby performing both horizontal and vertical zooming. Further details will be given in the description of the tenth embodiment.

Figure 13:
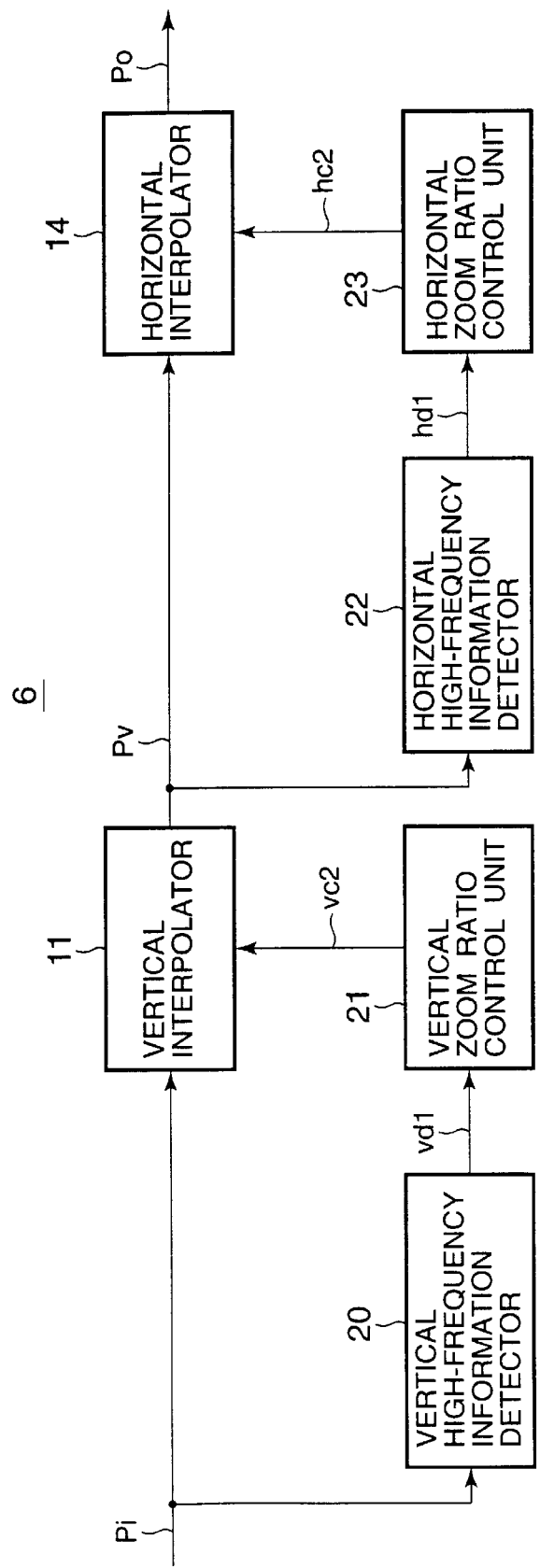
FIG. 13 illustrates the internal structure of the zoom processor in a second embodiment of the invention.

FIG. 13 illustrates the zoom processor 6 in a second embodiment of the invention. The vertical interpolator 11 and horizontal interpolator 14 are similar to the corresponding elements in the first embodiment.

The vertical high-frequency information detector 20 receives the input image data Pi and detects high spatial frequency information by taking differences between vertically adjacent pixels, performing an operation that generates the first derivative vd1 of the image data in the vertical direction. The vertical zoom ratio control unit 21 uses this first derivative vd1 to determine a vertical zoom ratio vc2. The vertical interpolator 11 uses the vertical zoom ratio vc2 to generate vertically zoomed image data Pv from the input image data Pi.

The horizontal high-frequency information detector 22 receives the vertically zoomed image data Pv and detects high spatial frequency information by taking differences between horizontally adjacent pixels, generating the first derivative hd1 of the image data Pv in the horizontal direction. The horizontal zoom ratio control unit 23 uses this first derivative hd1 to determine a horizontal zoom ratio hc2. The horizontal interpolator 14 uses the horizontal zoom ratio hc2 to generate output image data Po from the vertically zoomed image data Pv.

Figure 14A:
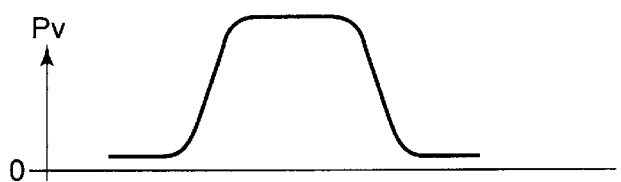
FIGS. 14A, 14B, 14C, and 14D are spatial waveform diagrams illustrating the operation of the second embodiment.
Figure 14B:
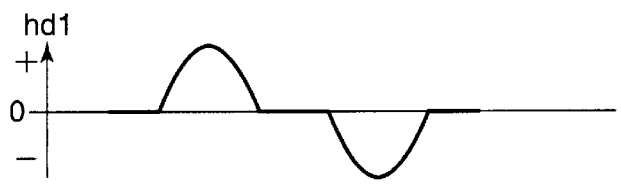
Figure 14C:
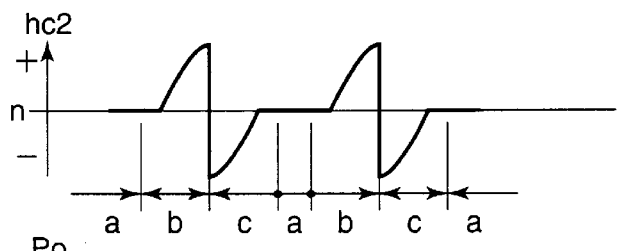

Horizontal zooming in the second embodiment is illustrated in FIGS. 14A to 14D. FIG. 14A shows an example of brightness levels in a horizontal line in the image data Pv output by the vertical interpolator 11. FIG. 14B shows the corresponding horizontal first derivative hd1 output by the horizontal high-frequency information detector 22. FIG. 14C shows the horizontal zoom ratio hc2 calculated by the horizontal zoom ratio control unit 23. At an edge (b, c), the horizontal zoom ratio control unit 23 calculates hc2 by the following equations, in which n is the basic zoom ratio, k is an arbitrary positive constant parameter, abs denotes absolute value, and r is the distance across the edge, normalized so that the width of the edge (b+c) is unity.

$$hc2 = n + (k \times abs(hd1)) \text{ if } 0.0 \leq r < 0.5$$

$$hc2 = n - (k \times abs(hd1)) \text{ if } 0.5 \leq r < 1.0$$

As illustrated in FIG. 14C, the average value of the zoom ratio over the entire edge is the basic zoom ratio (n).

$$AVE(hc2) = n$$

Figure 14D:
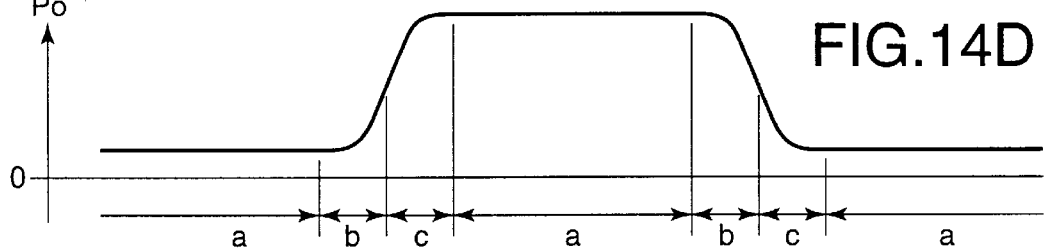

FIG. 14D depicts expanded output image data Po obtained by interpolation with the variable zoom ratio hc2.

Figure 15:
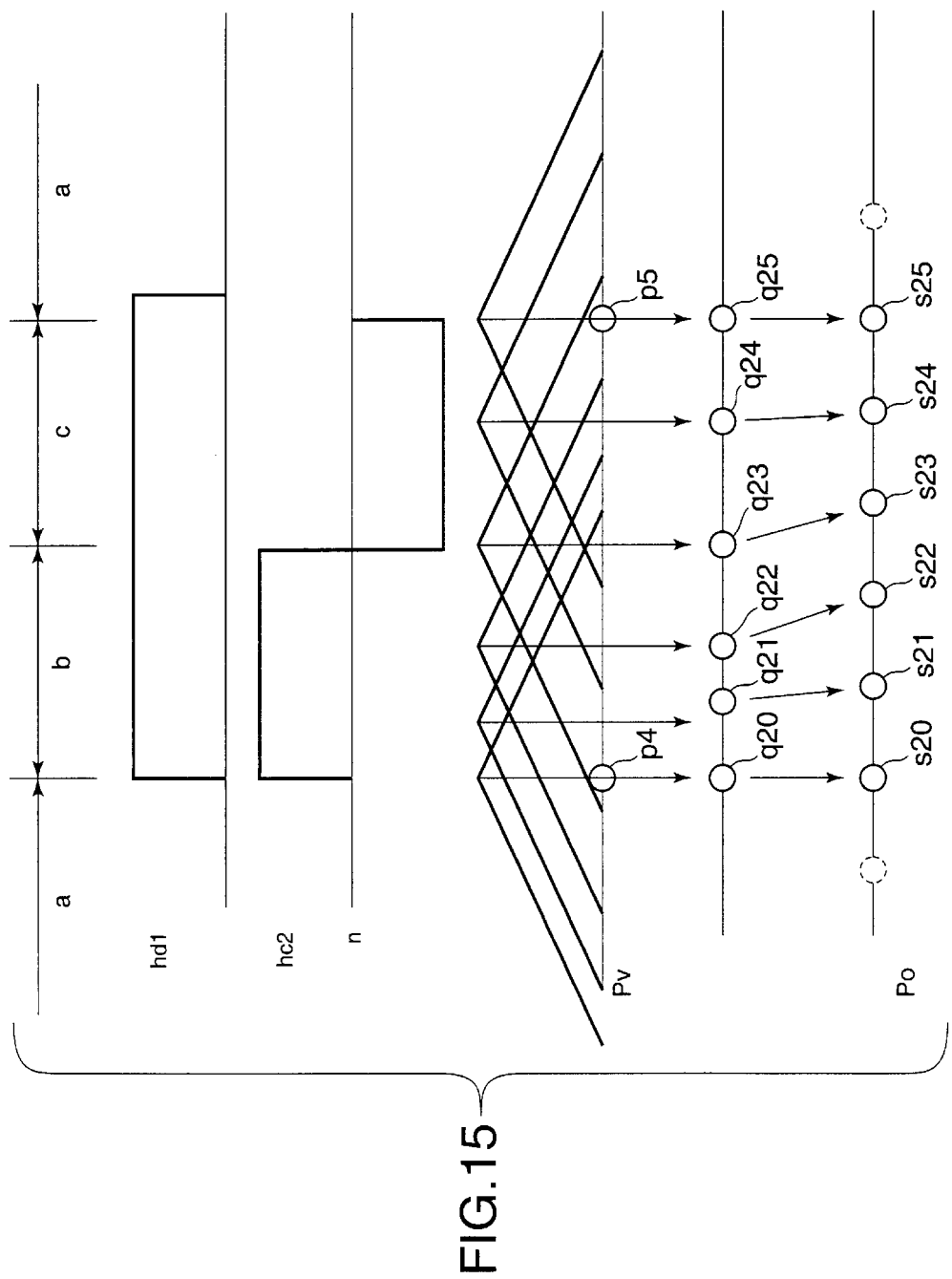
FIG. 15 illustrates interpolation in the second embodiment at a two-pixel edge.

FIG. 15 shows another example, in which the edge comprises only two pixels (p4, p5) in the vertically zoomed image data Pv. The edge is still divided into a leading segment (b) and a trailing segment (b). In this example, the first derivative (hd1) is constant over both segments. The zoom ratio (hc2) is greater than n in the leading segment (b), and less than n in the trailing segment (c). The interpolation points of the output pixels (q20 to q25) are spaced more closely in the leading segment (b) than in the trailing segment (c). As in the first embodiment, if the distance between p4 and p5 is taken to be unity, then the spacing between the interpolation points is equal to the reciprocal of the zoom ratio. When displayed, the interpolated pixels (s20 to s25) are evenly spaced.

Vertical zooming is performed in the same way as horizontal zooming. The horizontal zoom ratio and vertical zoom ratio are mutually independent, and different values of the parameter k may be used in the horizontal and vertical directions.

The second embodiment has the same general effect as the first embodiment. Loss of edge sharpness is mitigated by concentrating more of the edge variation into trailing edge segments when an image is expanded. Pixel drop-out is mitigated by keeping more pixels in leading edge segments when an image is reduced.

In a variation of the second embodiment, the sign of the first derivative is switched from positive to negative at an arbitrary point i ($0 < i < 1$) instead of at the midpoint ($r = 0.5$). In this variation, the zoom ratio is calculated as follows.

$$hc2 = n + ((1-i) \times k \times abs(hd1)) \text{ if } 0 \leq r < i$$

$$hc2 = n - (i \times k \times abs(hd1)) \text{ if } i \leq r < 1.0$$

In another variation of the second embodiment, the first derivative is calculated on the basis of three or more consecutive pixels, instead of by simply taking the difference between two adjacent pixels. The parameters r and i shown above may be normalized so that the distance between the outermost pixels referenced in calculating the first derivative is equal to unity.

Figure 16:
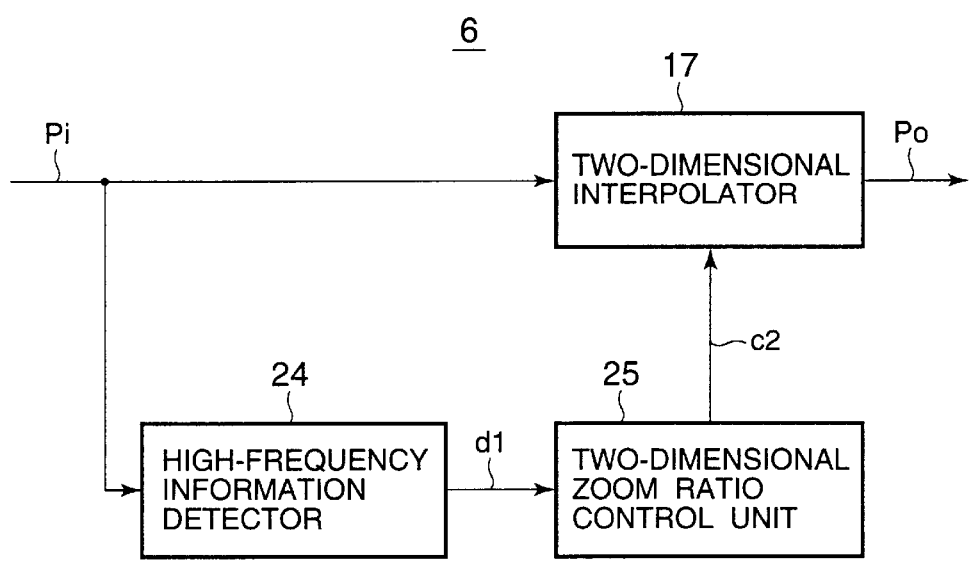
FIG. 16 illustrates the internal structure of the zoom processor in a variation of the second embodiment.

Horizontal zooming and vertical zooming may also be carried out simultaneously in the second embodiment. The zoom processor 6 then has the structure shown in FIG. 16, comprising a two-dimensional interpolator 17, a high-frequency information detector 24, and a two-dimensional zoom ratio control unit 25. The high-frequency information detector 24 detects both horizontal and vertical variations in the input image data and calculates a two-dimensional first derivative d1. The two-dimensional zoom ratio control unit 25 calculates a two-dimensional zoom ratio c2 from the two-dimensional first derivative d1, using the equations given above in each dimension. The two-dimensional interpolator 17 uses the two-dimensional zoom ratio c2 for two-dimensional (horizontal and vertical) interpolation. Further details will be given in the tenth embodiment.

Figure 17:
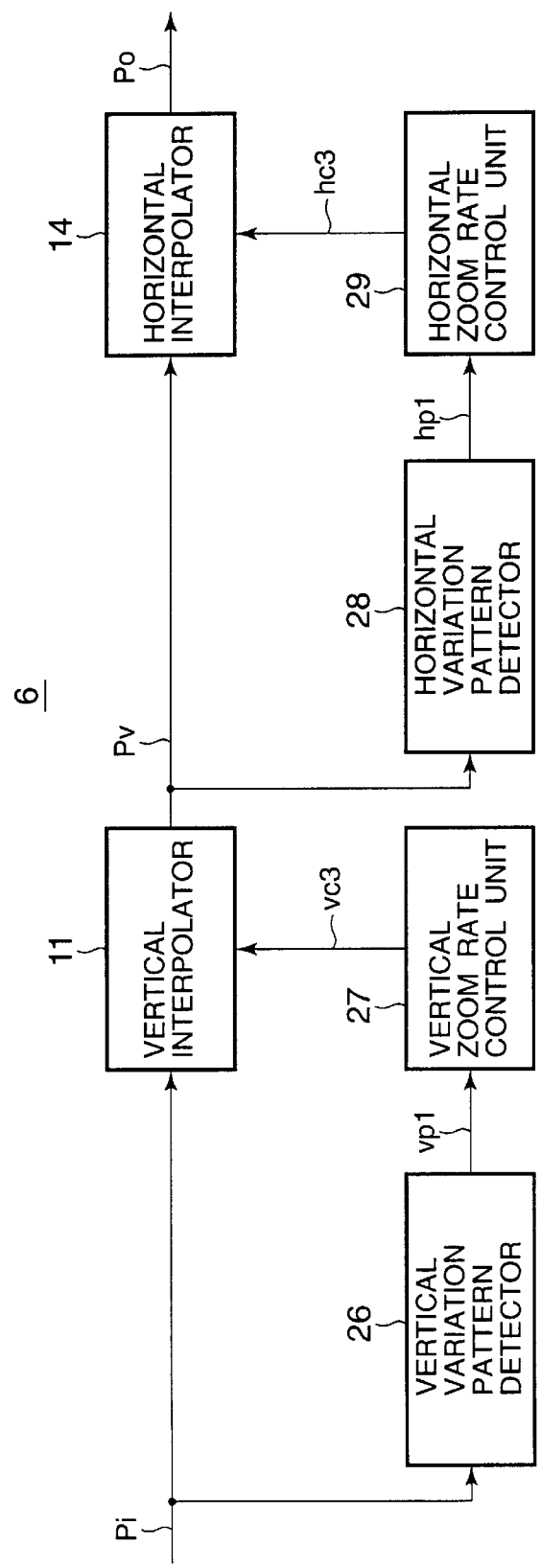
FIG. 17 illustrates the internal structure of the zoom processor in a third, a fourth, and a fifth embodiment of the invention.

FIG. 17 illustrates the zoom processor 6 in a third embodiment of the invention. The vertical interpolator 11 and horizontal interpolator 14 are similar to the corresponding elements in the first embodiment.

The vertical variation pattern detector 26, operating as a first processor, receives the input image data Pi from the memory 5, detects high spatial frequency information by detecting patterns of differences between vertically adjacent pixels, and generates vertical variation pattern information vp1. The vertical zoom ratio control unit 27 uses the vertical variation pattern information vp1 to determine a vertical zoom ratio vc3. The vertical interpolator 11 uses the vertical zoom ratio vc3 to generate vertically zoomed image data Pv from the input image data Pi.

The horizontal variation pattern detector 28 receives the vertically zoomed image data Pv, detects high spatial frequency information by detecting patterns of differences between horizontally adjacent pixels, and generates horizontal variation pattern information hp1. The horizontal zoom ratio control unit 29 uses the horizontal variation pattern information hp1 to determine a horizontal zoom ratio hc3. The horizontal interpolator 14 uses the horizontal zoom ratio hc3 to generate output image data Po from the vertically zoomed image data Pv.

As explained in the first embodiment, a vertical low-pass filter or bandpass filter may be inserted between the memory 5 and the vertical variation pattern detector 26, to remove noise from the image data supplied to the vertical variation pattern detector 26, and a horizontal low-pass filter or bandpass filter may be inserted between the vertical interpolator 11 and the horizontal variation pattern detector 28, to remove noise from the vertically zoomed image data Pv.

Figure 18:
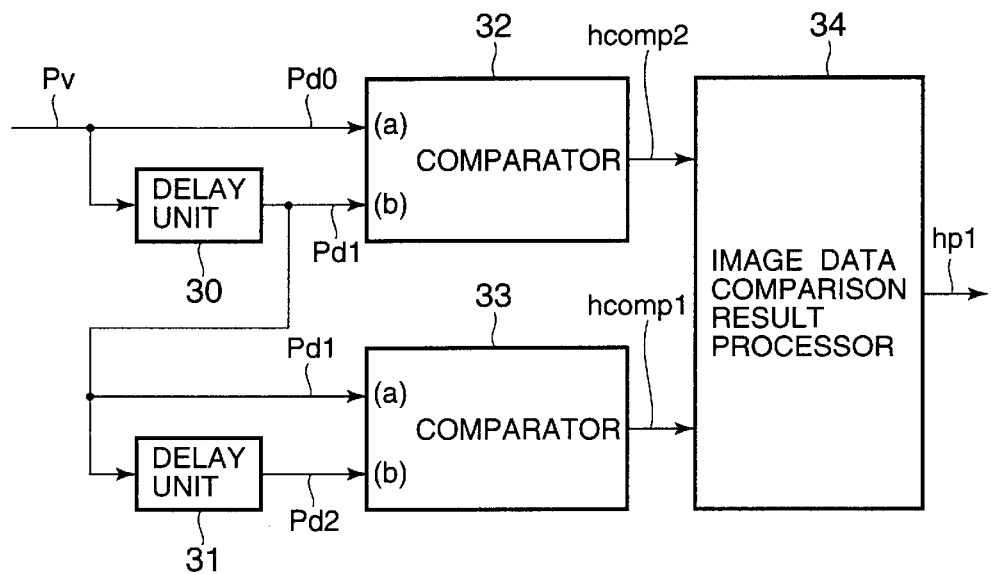
FIG. 18 illustrates the internal structure of the horizontal variation pattern detector in FIG. 17 in the third and fourth embodiments.

FIG. 18 shows the internal structure of the horizontal variation pattern detector 28, which comprises a pair of delay units 30, 31, a pair of comparators 32, 33, and an image data comparison result processor 34.

The image data Pv output from the vertical interpolator 11 are supplied as pixel data Pd0 to the comparator 32, and are also supplied to delay unit 30. Delay unit 30 stores the received data Pd0 for one pixel interval, and supplies the stored data as pixel data Pd1 to the comparators 32, 33 and delay unit 31. Delay unit 31 stores the received data Pd1 for one pixel interval, and supplies the stored data as pixel data Pd2 to comparator 33.

Comparator 32 thus receives pixel data delayed by zero pixels (Pd0) and one pixel (Pd1) with respect to the image data Pv, while comparator 33 receives pixel data delayed by one pixel (Pd1) and two pixels (Pd2) with respect to the image data Pv. The three pixel values supplied to the two comparators 32, 33 correspond to three consecutive pixels (Pd2, Pd1, Pd0) in one horizontal scanning line of the image. Comparator 32 receives the third pixel (Pd0) as its first input (a) and the second pixel (Pd1) as its second input (b), compares the two input values, and generates a comparison result hcomp2. Comparator 33 receives the second pixel (Pd1) as its first input (a) and the first pixel (Pd2) as its second input (b), compares the two input values, and generates a comparison result hcomp1.

Figure 19:
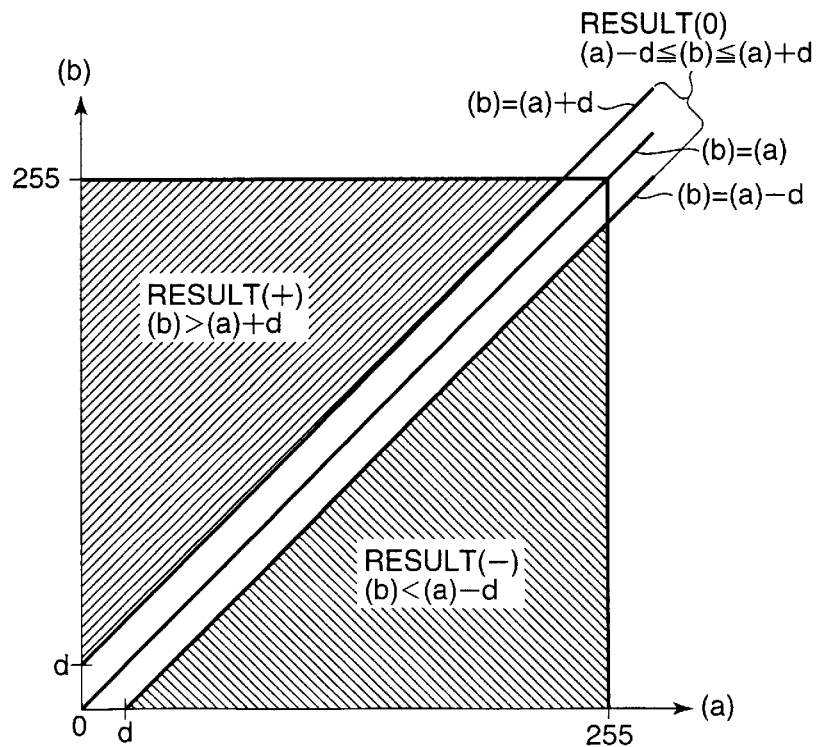
FIG. 19 is a graph illustrating the operation of the comparators in FIG. 18 in the third embodiment.

The comparators 32, 33 operate as indicated in FIG. 19. The horizontal axis represents the first input value (a) on a scale from zero to two hundred fifty-five, which is suitable if the input values are eight-bit values. The vertical axis represents the second input value (b) on a similar scale from zero to two hundred fifty-five. If the second input (b) exceeds the first input (a) by more than a predetermined quantity (d), the comparison result has a first value, indicated by a plus sign (+) in the drawing, meaning that the second input is larger. If the first input (a) exceeds the second input (b) by more than the predetermined quantity (d), the comparison result has a second value, indicated by a minus sign (−) in the drawing, meaning that the first input is larger. If the difference between the two input values (a and b) is equal to or less than the predetermined quantity (d), the comparison result has a third value (0), meaning that the two inputs are approximately equal. The comparators 32, 33 thus operate with a dead band from −d to +d, described below as a dead band of ±d, generating information indicating the polarity (positive, negative, or zero) of the difference between the values of adjacent pixels (zero indicating the dead band).

The purpose of the ±d dead band is to reduce the effect of noise in the image data.

The image data comparison result processor 34 generates the horizontal variation pattern information hp1 by combining the comparison results hcomp1 and hcomp2. The horizontal variation pattern information hp1 is accordingly a digital signal with nine values, identified as A to J in Table 1. Table 1 also lists the zoom ratios hc3 output by the horizontal zoom ratio control unit 29 for each pattern, n being the basic zoom ratio and $\alpha$ being an arbitrary positive quantity less than n ($0<\alpha<n$).

Each pattern represents a pattern of variation of three horizontally consecutive pixels. The listed zoom ratio hc3 is applied at the position of the second of the three pixels.

TABLE 1

| hcomp1 | hcomp2 | hp1 | hc3 |
| --- | --- | --- | --- |
| (0) | (0) | A | n |
| (0) | (+) | B | n + $\alpha$ |
| (0) | (−) | C | n + $\alpha$ |
| (+) | (0) | D | n − $\alpha$ |
| (−) | (0) | E | n − $\alpha$ |
| (+) | (+) | F | n |
| (−) | (−) | G | n |
| (+) | (−) | H | n |
| (−) | (+) | J | n |

In pattern A, there are substantially no pixel-to-pixel variations (none greater than ±d), so the basic zoom ratio (n) is applied.

In patterns B and C, there is substantially no variation between the first two pixel values, but the third pixel value is significantly higher or lower than the second pixel value. These patterns correspond to leading edge segments. An increased zoom ratio (n+$\alpha$) is applied.

In patterns D and E, there is substantially no variation between the last two pixel values, but the first pixel value is significantly higher or lower than the second pixel value. These patterns correspond to trailing edge segments. A decreased zoom ratio (n−$\alpha$) is applied.

In patterns F and G, the same type of variation appears between the first two pixels as between the last two pixels, either an increase in both cases, or a decrease in both cases. The basic zoom ratio (n) is applied.

In patterns H and J, opposite variations appear between the first two pixels and the last two pixels, the variation being an increase in one case and a decrease in the other case. The basic zoom ratio (n) is applied.

Figure 20A:
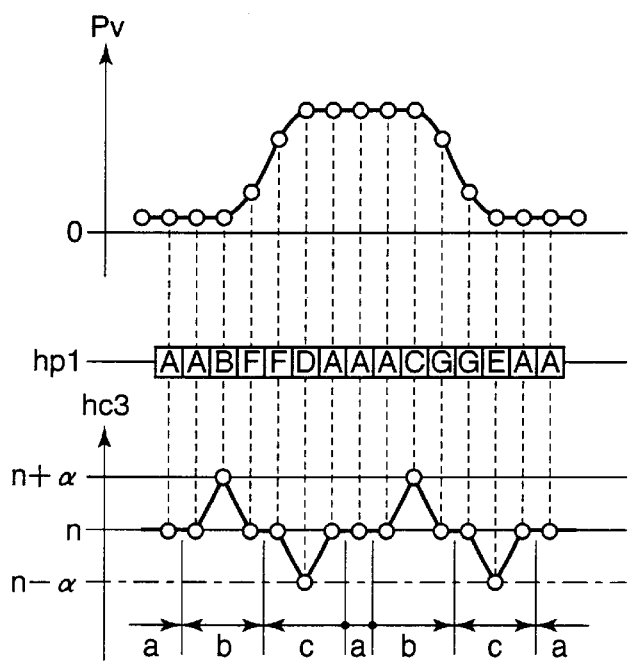
FIGS. 20A, 20B, and 20C are spatial waveform diagrams illustrating the operation of the third embodiment.
Figure 20B:
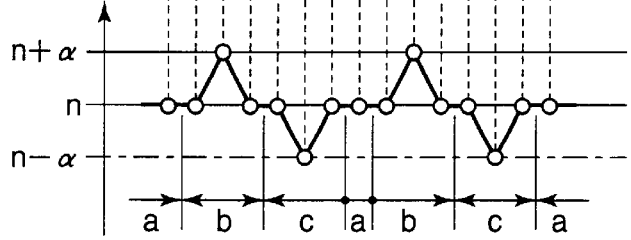
Figure 20C:
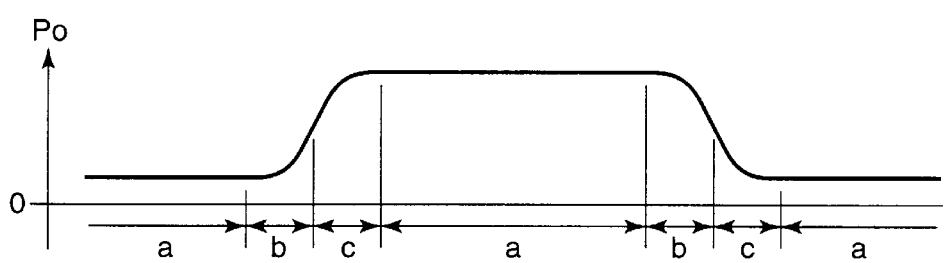

FIG. 20A shows an example of pixel data values in a horizontal line in the vertically zoomed image data Pv, and the corresponding pattern information hp1 output by the horizontal variation pattern detector 28. FIG. 20B shows the zoom ratio hc3 output by the horizontal zoom ratio control unit 29. The zoom ratios at positions between the pixels in the image data Pv are calculated by linear interpolation. As in the first embodiment, the horizontal scanning line can be divided into three types of segments: uniform segments (a), in which the basic zoom ratio (n) is applied; leading edge segments (b), in which the zoom ratio varies between n and n+$\alpha$; and trailing edge segments (c), in which the zoom ratio varies between n and n−$\alpha$. FIG. 20C shows the appearance of these three types of segments (a, b, c) in expanded data output by the horizontal interpolator 14.

Figure 21:
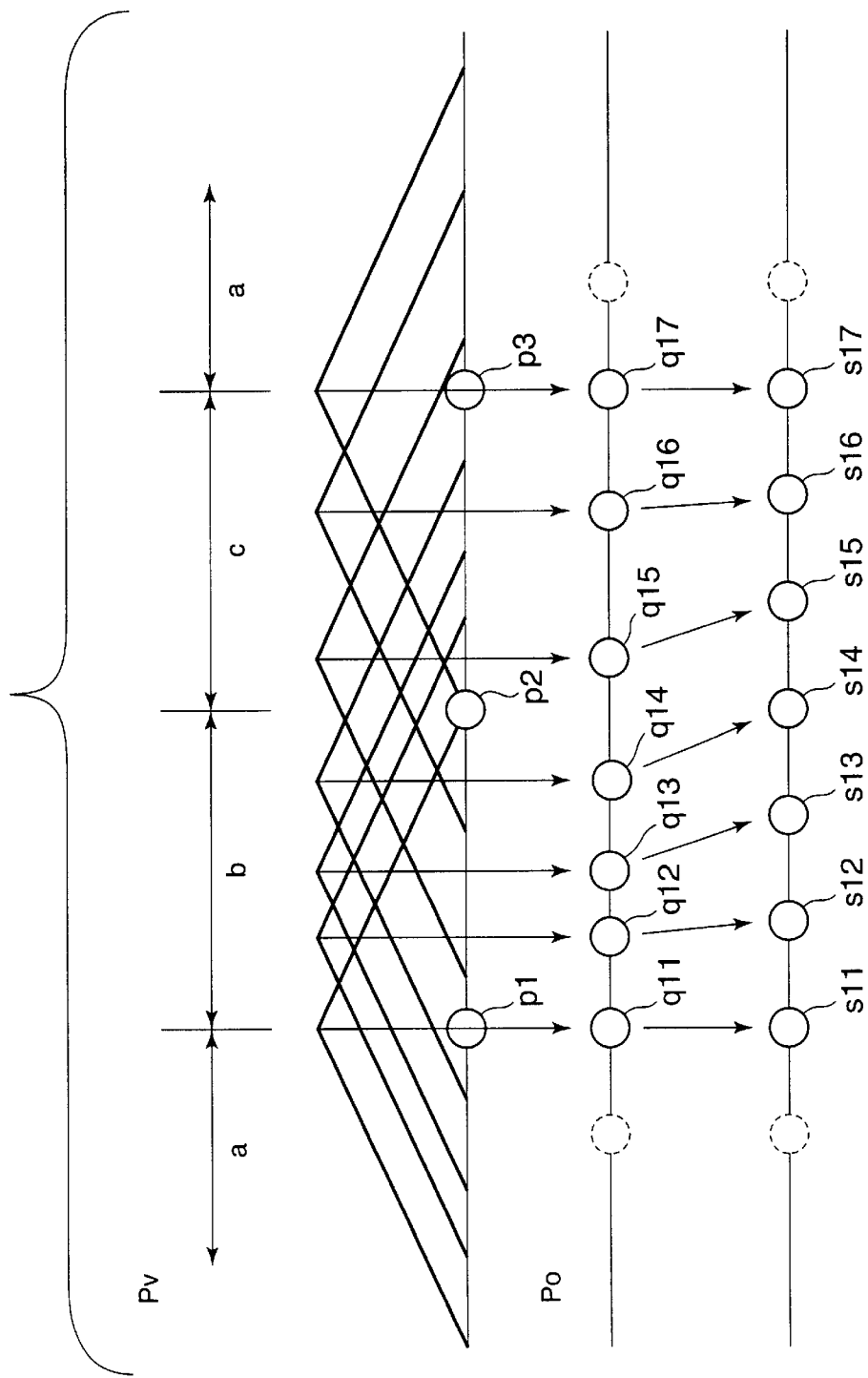
FIG. 21 illustrates interpolation in the third embodiment at a three-pixel edge.

FIG. 21 illustrates horizontal zooming in the third embodiment at an edge comprising three horizontally consecutive pixels (p1, p2, p3) in the vertically zoomed image data Pv, when the basic zoom ratio (n) applied in uniform segments (a) is three. Output image data are generated at seven interpolation points (q11 to q17), using the type of linear filter response characteristic illustrated in FIG. 2. As explained in the first embodiment, if the distance between p1 and p2 is taken to be unity, then the zoom ratio is the reciprocal of the distance between the interpolation points, so the positions of the interpolation points can be obtained by cumulative summation of the reciprocals of the zoom ratios output by the horizontal zoom ratio control unit 29. When displayed, the output pixels (s11 to s17) are equally spaced.

A comparison of FIG. 21 with FIG. 11 shows that the third embodiment provides much the same effect as the first embodiment. Leading edge segments (b) are zoomed with higher zoom ratios than trailing edge segments (c), and the average value of the zoom ratio over an entire horizontal scanning line is equal to the basic zoom ratio (n).

$$AVE(hc3)=n$$

In the third embodiment, the parameter $\alpha$ can be adjusted to control edge sharpness in the output image. Larger values of $\alpha$ lead to sharper edges. Edge sharpness can be controlled in this way even when the basic zoom ratio n is equal to unity.

The basic zoom ratio n and parameter $\alpha$ used in the horizontal direction can be set independently of the basic zoom ratio n and parameter $\alpha$ used in the vertical direction.

Figure 22:
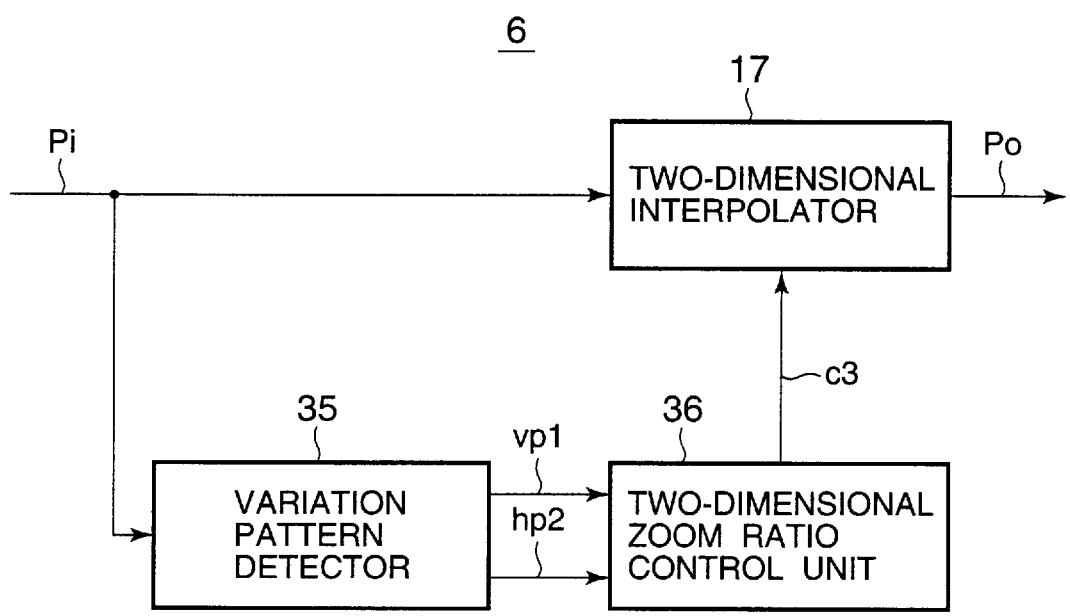
FIG. 22 illustrates the internal structure of the zoom processor in a variation of the third embodiment.

Referring to FIG. 22, horizontal zooming and vertical zooming may also be carried out simultaneously in the third embodiment. The zoom processor 6 then comprises a two-dimensional interpolator 17, a variation pattern detector 35, and a two-dimensional zoom ratio control unit 36. The variation pattern detector 35 detects both horizontal and vertical variations in the input image data and generates both vertical variation pattern information vp1 and horizontal variation pattern information hp1. The two-dimensional zoom ratio control unit 36 calculates a two-dimensional zoom ratio c3 from the supplied pattern information vp1 and hp1. The two-dimensional interpolator 17 uses the two-dimensional zoom ratio c3 for two-dimensional (horizontal and vertical) interpolation. A detailed description of the calculation of vp1, hp1, and c3 will be omitted, since the process is analogous to the calculation of hp1 and hc3 summarized in Table 1, but the two-dimensional interpolation process will be illustrated in the tenth embodiment.

Figure 23:
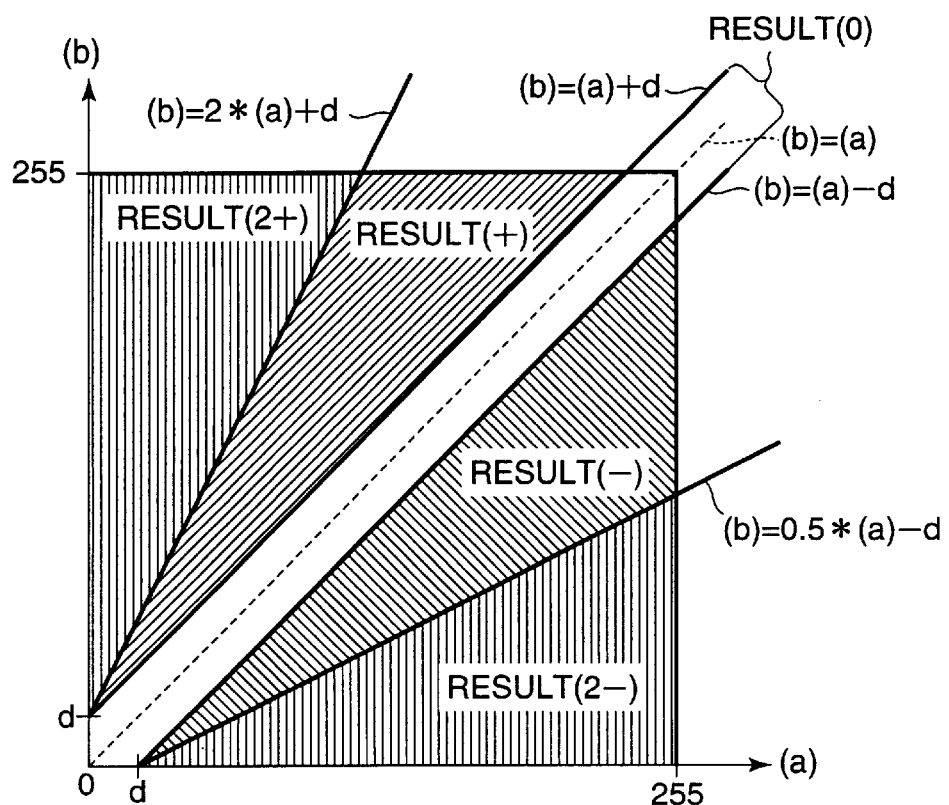
FIG. 23 is a graph illustrating the operation of the comparators in FIG. 18 in the fourth embodiment.

In a fourth embodiment of the invention, the zoom ratio is adjusted according to both the polarity and magnitude of the pixel-to-pixel variations. The fourth embodiment has the same hardware configuration as the third embodiment, illustrated in FIGS. 17 and 18, but in relation to horizontal zooming, for example, the comparators 32, 33 operate as illustrated in FIG. 23, generating comparison results (hcomp1, hcomp2) with five possible values.

As in the third embodiment, one comparison result (0) indicates that the first and second inputs (a and b) do not differ by more than a predetermined positive quantity d.

Another comparison result (+) indicates that the second input (b) exceeds the first input (a) by more than d, but does not exceed twice the first input (a) by more than d.

Another comparison result (2+) indicates that the second input (b) exceeds twice the first input (a) by more than d.

Another comparison result (−) indicates that the first input (a) exceeds the second input (b) by more than d, but that half the first input does not exceed the second input (b) by more than d.

Another comparison result (2−) indicates that half the first input (a) exceeds the second input (b) by more than d.

These results are summarized by the inequalities at the bottom of FIG. 23.

From these comparison results, the image data comparison result processor 34 generates the pattern information (A to J) described in the third embodiment, and four additional patterns (B+, C−, D+, E−). When the image data comparison result processor 34 outputs one of these additional patterns, the horizontal zoom ratio control unit 29 adjusts the zoom ratio (n±$\alpha$) used in the third embodiment by a further quantity $\beta$. This further quantity $\beta$ may be positive or negative, but its absolute value is less than the difference between n and $\alpha$. Accordingly, the following condition is satisfied.

$$n-\alpha-ABS(\beta)>0$$

Table 2 summarizes the comparator outputs (hcomp1, hcomp2), the horizontal variation pattern information (hp1), and the zoom ratio (hc3) generated by the horizontal variation pattern detector 28 and horizontal zoom ratio control unit 29 in the fourth embodiment. As in the third embodiment, the horizontal variation pattern information (hp1) describes the pattern of variation of the levels of three horizontally consecutive pixels, and the zoom ratio (hc3) is applied at the position of the second of these three pixels.

In pattern A, there are substantially no pixel-to-pixel variations (none greater than ±d), and the basic zoom ratio (n) is applied.

In patterns B and C, there is substantially no variation between the first two pixel values, but the third pixel value is moderately higher or lower than the second pixel value. These patterns correspond to comparatively gentle leading edge segments. An increased zoom ratio (n+$\alpha$) is applied.

In patterns B+ and C−, there is substantially no variation between the first two pixel values, but the third pixel value is markedly higher or lower than the second pixel value. These patterns correspond to comparatively sharp leading edge segments. The increased zoom ratio (n+$\alpha$) is further adjusted (to n+$\alpha$+$\beta$).

TABLE 2

| hcomp1 | hcomp2 | hp1 | hc3 |
|---|---|---|---|
| (0) | (0) | A | n |
| (0) | (+) | B | n + $\alpha$ |
| (0) | (2+) | B+ | n + $\alpha$ + $\beta$ |
| (0) | (−) | C | n + $\alpha$ |
| (0) | (2−) | C− | n + $\alpha$ + $\beta$ |
| (+) | (0) | D | n − $\alpha$ |
| (2+) | (0) | D+ | n − $\alpha$ − $\beta$ |
| (−) | (0) | E | n − $\alpha$ |
| (2−) | (0) | E− | n − $\alpha$ − $\beta$ |
| (+) | (+) | F | n |
| (2+) | (+) | | |
| (+) | (2+) | | |
| (2+) | (2+) | | |
| (−) | (−) | G | n |
| (2−) | (−) | | |
| (−) | (2−) | | |
| (2−) | (2−) | | |
| (+) | (−) | H | n |
| (2+) | (−) | | |
| (+) | (2−) | | |
| (2+) | (2−) | | |
| (−) | (+) | J | n |
| (2−) | (+) | | |
| (−) | (2+) | | |
| (2−) | (2+) | | |

In patterns D and E, there is substantially no variation between the last two pixel values, but the first pixel value is moderately higher or lower than the second pixel value. These patterns correspond to comparatively gentle trailing edge segments. A decreased zoom ratio (n−$\alpha$) is applied.

In patterns D+ and E−, there is substantially no variation between the last two pixel values, but the first pixel value is markedly higher or lower than the second pixel value. These patterns correspond to comparatively sharp trailing edge segments. The decreased zoom ratio (n−α) is further adjusted (to n−α−β).

In patterns F and G, the same type of variation appears between the first two pixels as between the last two pixels, either an increase in both cases, or a decrease in both cases. The basic zoom ratio (n) is applied, regardless of the magnitude of the variations.

In patterns H and J, opposite variations appear between the first two pixels and the last two pixels, an increase in one case and a decrease in the other case. The basic zoom ratio (n) is applied, regardless of the magnitude of the variations.

If the parameter β is positive, then the zoom ratio is further increased at comparatively sharp leading edge segments, and further reduced at comparatively sharp trailing edge segments. As a result, these comparatively sharp trailing edge segments appear sharper in the image displayed by the fourth embodiment than in the image displayed by the third embodiment.

If the parameter β is negative, then the zoom ratio is made lower at comparatively sharp leading edge segments than at comparatively gentle leading edge segments, and is made higher at comparatively sharp trailing edge segments than at comparatively gentle trailing edge segments. As a result, comparatively sharp leading edge segments appear sharper in the image displayed by the fourth embodiment than in the image displayed by the third embodiment.

Vertical zooming in the fourth embodiment is controlled in the same way as horizontal zooming, using parameters α and β and a basic zoom-ratio parameter n. The parameters (n, α, β) used in vertical zooming need not be identical to the parameters (n, α, β) used in horizontal zooming.

The two parameters α and β employed in the fourth embodiment permit more flexible control over edge sharpness than the single parameter α used in the third embodiment. In particular, the value of β can be chosen to avoid over-enhancement or under-enhancement of edges. The fourth embodiment is particularly effective when a single pair of parameter values (α and β) is used for all images. However, it is also possible to provide a selection of parameter values (α and β), to fine-tune the zooming process.

In a variation of the fourth embodiment, interpolation is carried out two-dimensionally, as in FIG. 22.

Figure 24:
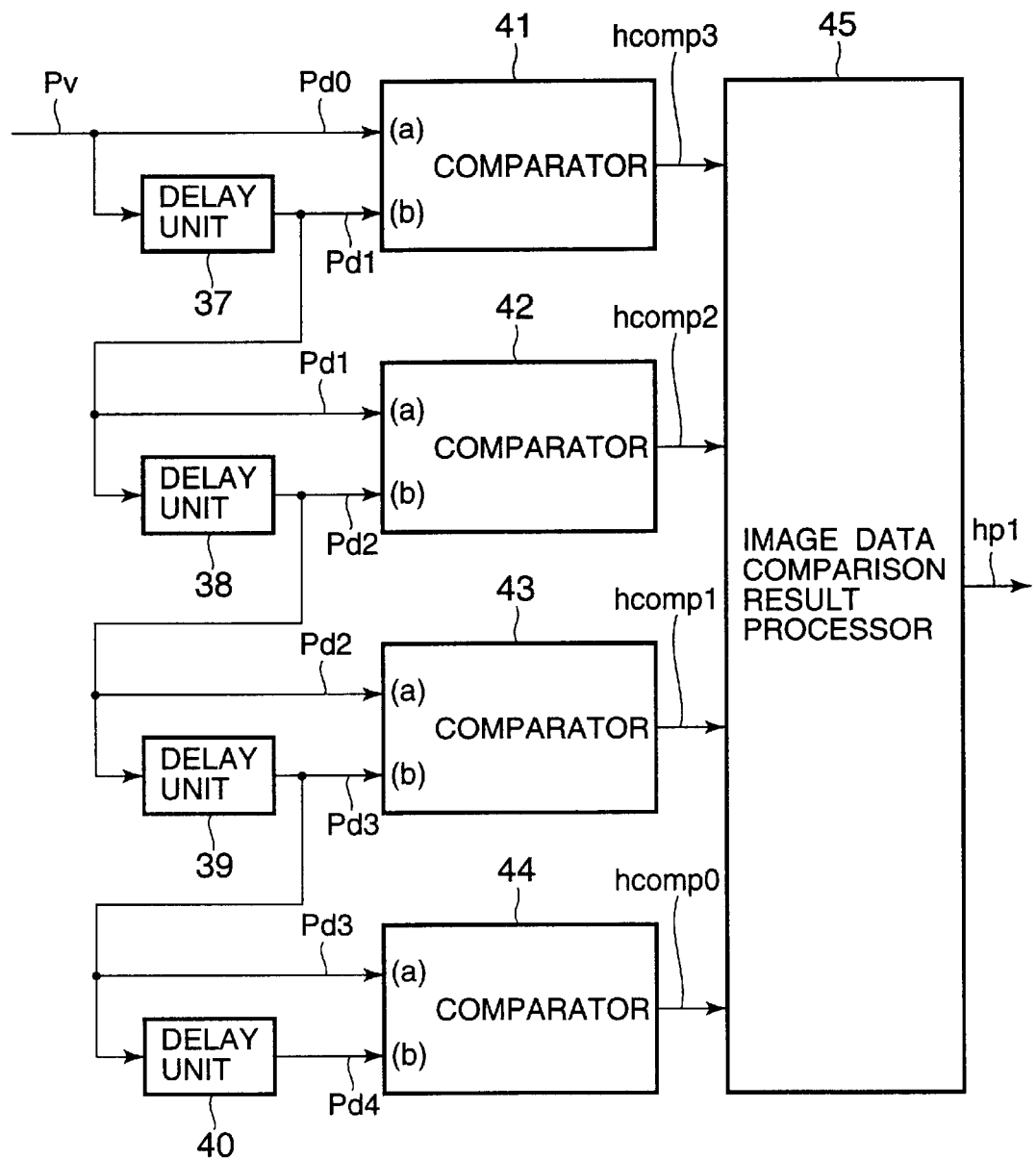
FIG. 24 illustrates the internal structure of the horizontal variation pattern detector in FIG. 17 in the fifth embodiment.

Whereas the pattern information in the third and fourth embodiments represented patterns of variation in the brightness levels of three consecutive pixels, in a fifth embodiment, the pattern information represents patterns of variation in the brightness levels of five consecutive pixels. Accordingly, the fifth embodiment has the general configuration shown in FIGS. 6 and 17, but the horizontal variation pattern detector 28, for example, has the internal structure shown in FIG. 24, comprising four delay units 37, 38, 39, 40, four comparators 41, 42, 43, 44, and an image data comparison result processor 45.

The delay units 37, 38, 39, 40 are coupled in series and generate image data Pd1, Pd2, Pd3, Pd4 delayed by one, two, three, and four pixel intervals, respectively, with respect to the vertically zoomed image data Pv (Pd0).

Each of the comparators 41, 42, 43, 44 is similar to the comparators in the third embodiment, having two input terminals (a and b) and generating a comparison result with three possible values (+, 0,−). These three values indicate whether the second input is greater than, approximately equal to, or less than the first input, the approximately equal result (0) corresponding to a dead band of ±d. Comparator 44 receives Pd3 and Pd4, and generates a comparison result hcomp0. Comparator 43 receives Pd2 and Pd3, and generates a comparison result hcomp1. Comparator 42 receives Pd2 and Pd3, and generates a comparison result hcomp2. Comparator 41 receives Pd0 and Pd1, and generates a comparison result hcomp3.

The image data comparison result processor 45 receives the comparison results from the comparators 41, 42, 43, 44, and generates horizontal variation pattern information hpl as indicated in Table 3. An X in Table 3 indicates a don't-care value. For example, pattern information A is output whenever hcomp1 and hcomp2 both indicate approximate equality (0), regardless of the values of hcomp0 and hcomp3. The pattern information includes patterns A to J as described in the third embodiment, and four new patterns (BF, CG, DF, EG).

The horizontal zoom ratio control unit 29 generates a corresponding zoom ratio hc3, also indicated in Table 3. This zoom ratio is applied at the position of the third pixel (Pd2) in the series of five pixels (Pd0 to Pd4). For patterns A to J, the horizontal zoom ratio control unit 29 generates the zoom ratios described in the third embodiment (n, n+α, n−α). For the four new patterns, the horizontal zoom ratio control unit 29 adjusts the zoom ratio (n±α) used in the third embodiment by a further quantity γ. This further quantity γ may be positive or negative, but its absolute value must satisfy the same condition as satisfied by the parameter β in the fourth embodiment, that is:

$$n-\alpha-ABS(\gamma)>0$$

TABLE 3

| hcomp0 | hcomp1 | hcomp2 | hcomp3 | hp1 | hc3 |
|---|---|---|---|---|---|
| X | (0) | (0) | X | A | n |
| X | (0) | (+) | (−) (0) | B | n + α |
| X | (0) | (+) | (+) | BF | n + α + γ |
| X | (0) | (−) | (−) | CG | n + α + γ |
| X | (0) | (−) | (0) (+) | C | n + α |
| (−) (0) | (+) | (0) | X | D | n − α |
| (+) | (+) | (0) | X | DF | n − α − γ |
| (−) | (−) | (0) | X | EG | n − α − γ |
| (0) (+) | (−) | (0) | X | E | n − α |
| X | (+) | (+) | X | F | n |
| X | (−) | (−) | X | G | n |
| X | (+) | (−) | X | H | n |
| X | (−) | (+) | X | J | n |

In pattern A, there are substantially no pixel-to-pixel variations (none greater than ±d) among the second, third, and fourth pixels, and the basic zoom ratio (n) is applied.

In patterns B and C, there is substantially no variation between the second and third pixels. The fourth pixel value is significantly higher or lower than the third pixel value, but this same variation is not seen between the fourth and fifth pixels. An increased zoom ratio (n+α) is applied.

In patterns BF and CG, the variation seen in the third and fourth pixels in pattern B or C is also seen in the fourth and fifth pixels. The increased zoom ratio (n+α) is further adjusted (to n+α+γ).

In patterns D and E, there is substantially no variation between the third and fourth pixels. The second pixel value is significantly higher or lower than the third pixel value, but this same variation is not seen between the first and second pixels. A decreased zoom ratio (n−α) is applied.

In patterns DF and EG, the variation seen in the second and third pixels in pattern D or E is also seen in the first and second pixels. The decreased zoom ratio (n−α) is further adjusted (to n−α−γ).

In patterns F and G, the same type of variation appears between the second and third pixels and between the third and fourth pixels, either an increase in both cases, or a decrease in both cases. The basic zoom ratio (n) is applied, regardless of the values of the first and fifth pixels.

In patterns H and J, opposite variations appear between the second and third pixels and the third and fourth pixels, an increase in one case and a decrease in the other case. The basic zoom ratio (n) is applied, regardless of the values of the first and fifth pixels.

The fifth embodiment distinguishes between brightness-level variations that continue over three or more consecutive pixels, and variations that occur at only one pair of pixels. If the parameter γ is positive, then the zoom ratio is altered more for the former variations than for the latter variations. If the parameter γ is negative, then the zoom ratio is altered more for the latter variations than for the former variations.

Vertical zooming in the fifth embodiment is controlled in the same way as horizontal zooming, using parameters α and γ. The zoom ratio and other parameters (n, α, γ) used in vertical zooming need not be identical to the zoom ratio and other parameters (n, α, γ) used in horizontal zooming.

The two parameters α and γ employed in the fifth embodiment permit more flexible control over edge sharpness than the single parameter α used in the third embodiment, because the width of the edge is taken into account. The fifth embodiment is particularly effective when a single pair of parameter values (α and γ) is used for all images. However, it is also possible to provide a selection of parameter values (α and γ), to fine-tune the zooming process.

In a variation of the fifth embodiment, the comparators 41, 42, 43, 44 generate comparison results with five possible values, as in the fourth embodiment, and the image data comparison result processor 45 determines the zoom ratio from the combination of these comparison results.

In another variation of the fifth embodiment, a two-dimensional zoom ratio is calculated, and interpolation is carried out two-dimensionally.

Although the third, fourth, and fifth embodiments have been described as dividing an edge into leading and trailing segments, when a variation persists over a sufficient number of consecutive pixels, the varying portion is divided into three segments: a leading segment (e.g., pattern B or C), an interior segment (e.g., pattern F or G), and a trailing segment (e.g., pattern D or E). The zoom ratio is increased in the leading segment and reduced in the trailing segment. The basic zoom ratio (n) is used in the interior segment.

A different way of processing interior segments will be shown in the sixth and seventh embodiments of the invention.

Figure 25A:
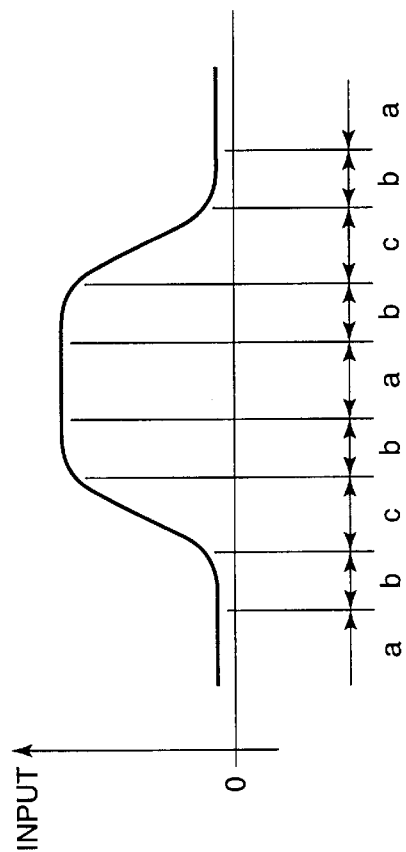
FIG. 25A illustrates pixel data values in part of an image, with edges divided into leading, interior, and trailing parts.
Figure 25B:
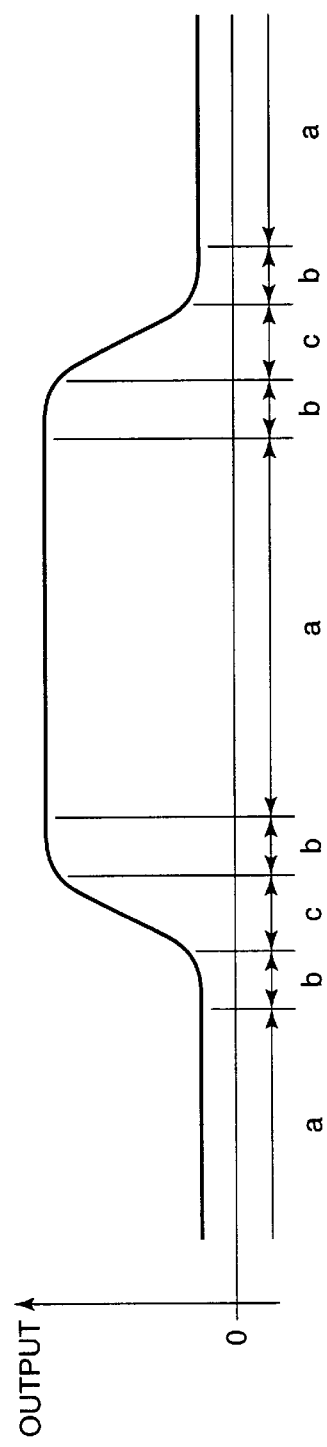
FIG. 25B illustrates corresponding pixel data values after image expansion according to a sixth and a seventh embodiment of the invention.
Figure 26A:
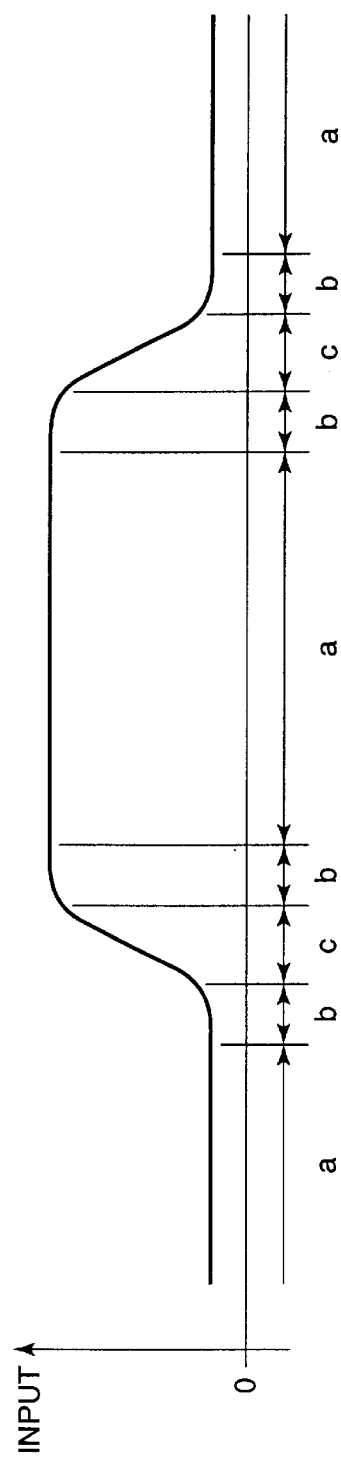
FIG. 26A illustrates pixel data values in part of an image, with edges divided into leading, trailing, and interior parts.
Figure 26B:
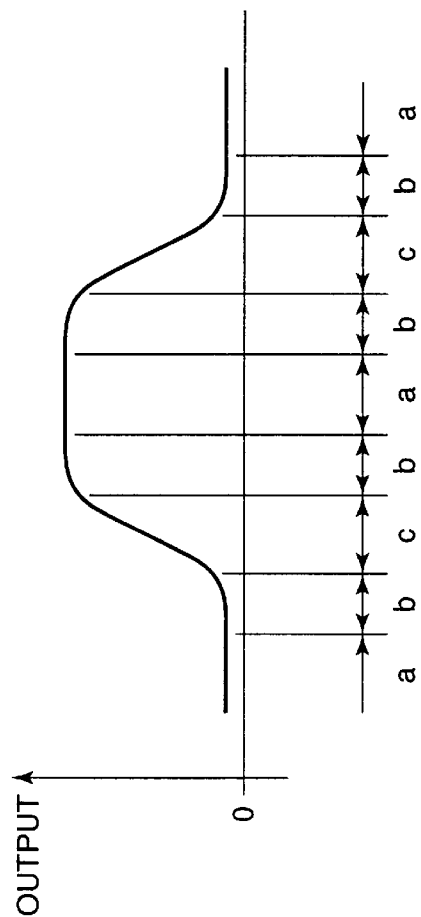
FIG. 26B illustrates corresponding pixel data values after image reduction according to the sixth and seventh embodiments of the invention.

FIGS. 25A and 25B illustrate image expansion and FIGS. 26A and 26B illustrate image reduction in the sixth and seventh embodiments. The horizontal axis in these drawings corresponds to one direction, either the horizontal or the vertical direction, in the image. The vertical axis represents the data values (brightness levels) of a row or column of pixels disposed in this direction.

In these embodiments, the input row or column of pixels (FIGS. 25A and 26A) is divided into uniform segments (a) in which the brightness level does not change, and edges (b, c). The edges are further divided into first, second, and third parts, more specifically into leading and trailing segments (b) and interior segments (c). A leading or trailing segment (b) is defined to be a segment in which the rate of change of the brightness level is itself changing. An interior segment (c) is defined to be a segment in which the brightness level changes at a substantially constant rate.

A basic zoom ratio (n) is applied in the uniform segments (a). A variable zoom ratio higher than n is applied in the leading and trailing edge segments (b). A variable zoom ratio lower than n is applied in the interior edge segments (c). The image is expanded or reduced by generating new image data (FIGS. 25B and 26B) at interpolation points positioned according to these zoom ratios. The average zoom ratio over the entire row or column of pixels is equal to n.

Figure 27:
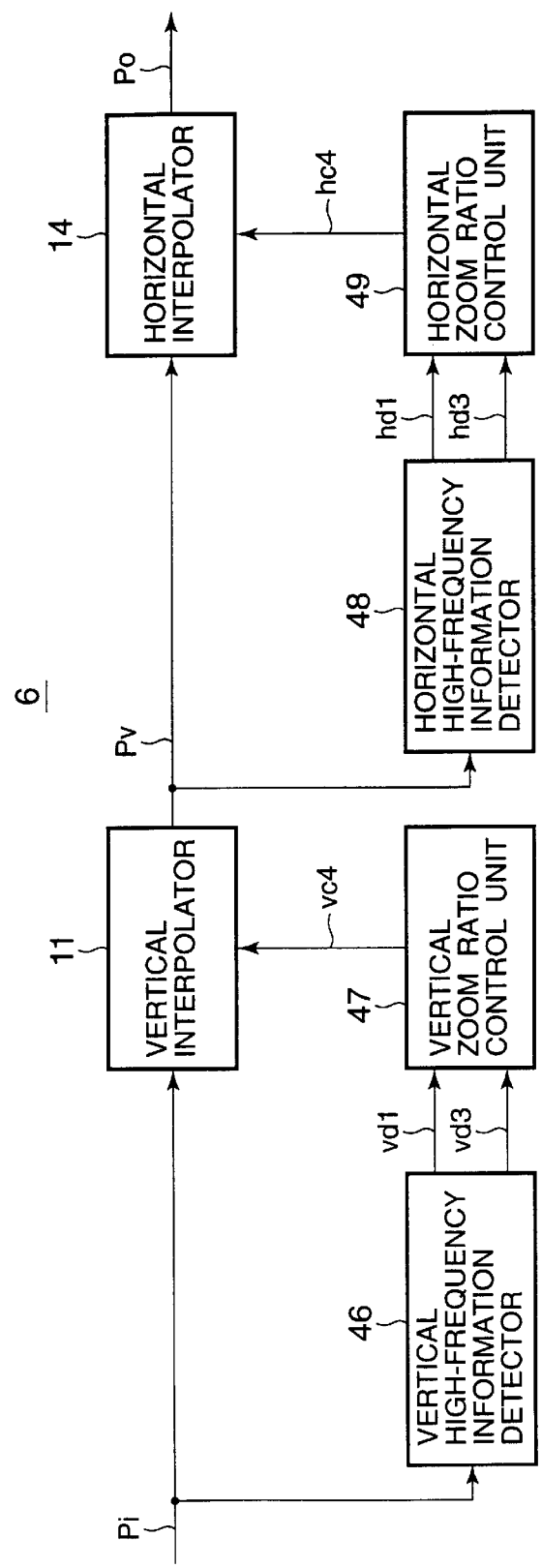
FIG. 27 illustrates the internal structure of the zoom processor in the sixth embodiment.

The internal structure of the zoom processor 6 in the sixth embodiment is shown in FIG. 27. The vertical interpolator 11 and horizontal interpolator 14 are similar to the corresponding elements in the first embodiment.

The vertical high-frequency information detector 46 receives input image data Pi from the memory 5 and detects high spatial frequency information by performing operations that generate the first derivative vd1 and third derivative vd3 of the image data in the vertical direction. The vertical zoom ratio control unit 47 uses these derivatives vd1, vd3 to determine a vertical zoom ratio vc4. The vertical interpolator 11 uses the vertical zoom ratio vc4 to generate vertically zoomed image data Pv from the received image data Pi.

The horizontal high-frequency information detector 48 receives the vertically zoomed image data Pv and detects high spatial frequency information by performing operations that generate the first derivative hd1 and third derivative hd3 of the image data in the horizontal direction. The horizontal zoom ratio control unit 49 uses these derivatives hd1, hd3 to determine a horizontal zoom ratio hc4. The horizontal interpolator 14 uses the horizontal zoom ratio hc4 to generate output image data Po from the vertically zoomed image data Pv.

As explained in the first embodiment, a vertical low-pass filter or bandpass filter may be inserted between the memory 5 and the vertical high-frequency information detector 46, to remove noise from the input image data Pi, and a horizontal low-pass filter or bandpass filter may be inserted between the vertical interpolator 11 and the horizontal high-frequency information detector 48, to remove noise from the vertically zoomed image data Pv. Alternatively, a coring unit with a dead band may be inserted between the vertical high-frequency information detector 46 and vertical zoom ratio control unit 47, or between the horizontal high-frequency information detector 48 and horizontal zoom ratio control unit 49.

Figure 28A:
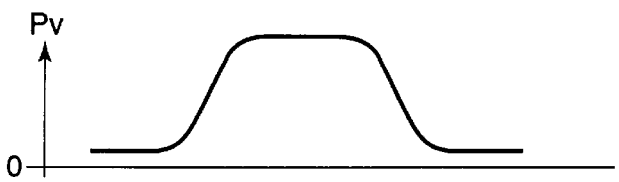
FIGS. 28A, 28B, 28C, 28D, 28E, and 28F are spatial waveform diagrams illustrating the operation of the sixth embodiment.
Figure 28B:
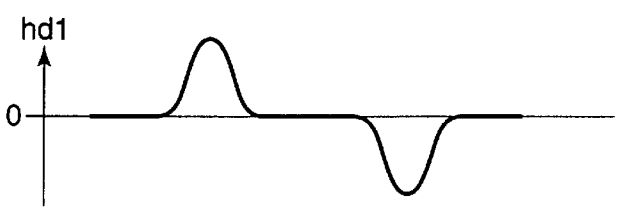
Figure 28C:
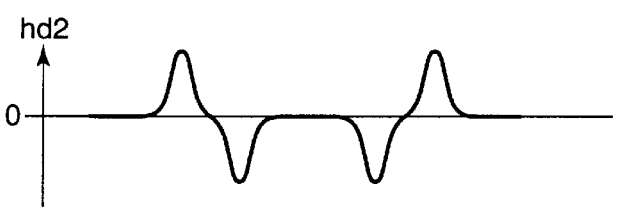
Figure 28D:
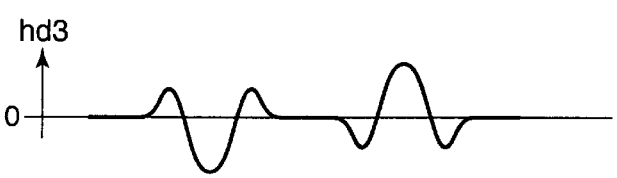

FIG. 28A shows an example of the brightness levels in a horizontal line in the image data Pv output by the vertical interpolator 11. FIG. 28B shows the corresponding horizontal first derivative hd1 output by the horizontal high-frequency information detector 48. FIG. 28C shows the corresponding horizontal second derivative, which is calculated internally by the horizontal high-frequency information detector 48. FIG. 28D shows the corresponding horizontal third derivative hd3 output by the horizontal high-frequency information detector 48. The horizontal zoom ratio control unit 49 calculates the horizontal zoom ratio hc4 by the following equation, in which n is the basic zoom ratio, and k is an arbitrary positive constant parameter.

$$hc4 = n + (k \times hd1 \times hd3)$$

Figure 28E:
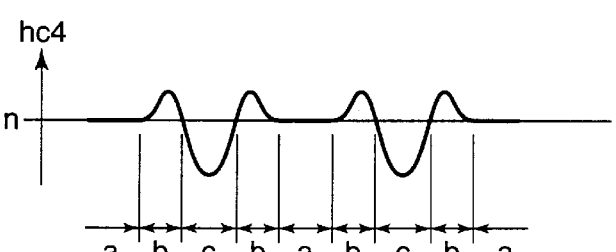

The result of applying this equation is shown in FIG. 28E. As described earlier, the zoom ratio hc4 is equal to n in the segments (a) of uniform brightness level, is greater than n in the leading and trailing edge segments (b), and is less than n in interior edge segments (c). The average value of hc4 over the entire horizontal line is equal to n.

$$AVE(hc4)=n$$

Figure 28F:
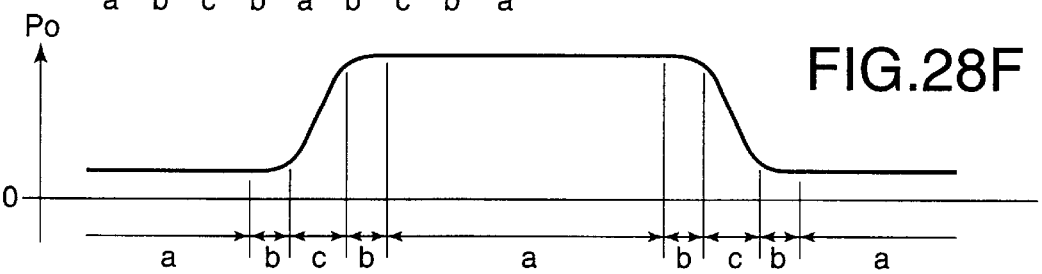

FIG. 28F depicts expanded image data Po obtained by interpolation with this varying zoom ratio hc4.

Similar operations are performed in the vertical direction to generate a varying vertical zoom ratio vc4. The average of this varying vertical zoom ratio vc4 is again equal to n.

Figure 29:
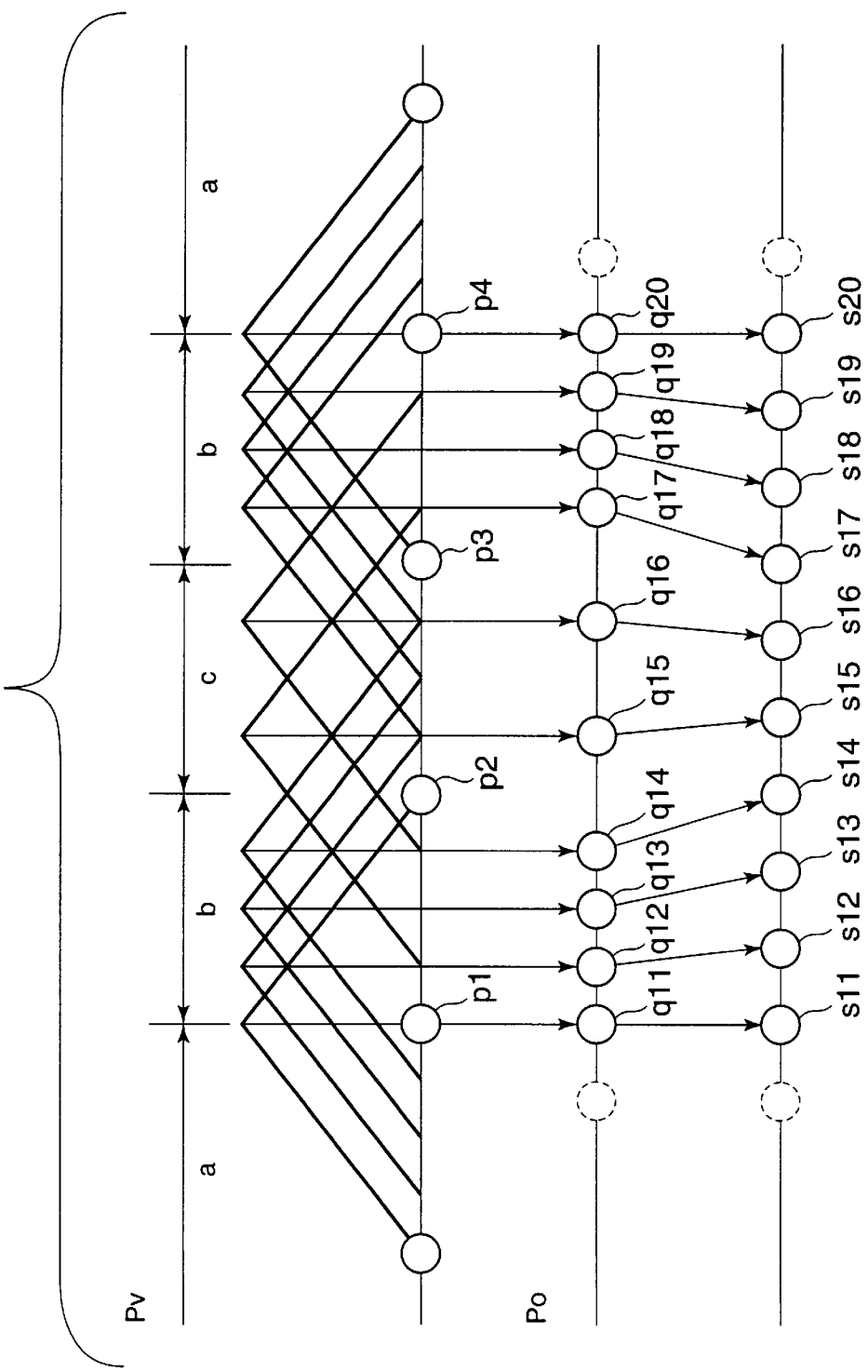
FIG. 29 illustrates interpolation in the sixth embodiment at a four-pixel edge.

FIG. 29 illustrates the generation of output image data Po at an edge comprising four horizontally consecutive pixels (p1, p2, p3, p4) in the vertically zoomed image data Pv, when the basic zoom ratio (n) applied in uniform segments (a) is three. New image data are generated at ten interpolation points (q11 to q20), using the type of linear filter response characteristic illustrated in FIG. 2. If the distance between p1 and p2 is taken to be unity, then the zoom ratio is the reciprocal of the distance between adjacent interpolation points. This distance can be seen to vary inversely to the height of the curve in FIG. 28E, being relatively short in the leading and trailing segments (b) and relatively long in the interior segment (c).

As explained in the first embodiment, the interpolation points are set at positions equal to cumulative sums of the reciprocals of the zoom ratios. That is, the filter coefficients used to generate the new pixel values, and the memory addresses of the pixels (p1, p2, etc.) to which the filter coefficients are applied, are obtained from these cumulative sums.

When the output image is displayed, the new pixels are evenly spaced, as indicated by s11 to s20 at the bottom of FIG. 29. Thus the leading and trailing edge segments (b), which have a zoom ratio higher than n, are expanded more than the interior edge segment (c), which has a zoom ratio lower than n. As a result, the expanded interior segment of the edge (c) appears sharper than it would appear if expanded by the conventional uniform zoom ratio, while the leading and trailing segments of the edge (b) appear less sharp. Thus the sixth embodiment maintains edge sharpness by concentrating more of the edge variation into the interior segment of the expanded edge.

When an image is reduced, by increasing the zoom ratio in the leading and trailing segments of an edge, the sixth embodiment mitigates the problem of pixel dropout in the leading and trailing edge segments.

Vertical zooming is performed in the same way as horizontal zooming. The horizontal zoom ratio and vertical zoom ratio are mutually independent. The value of the parameter k may also differ between the horizontal and vertical directions.

The value of the parameter k can be increased to enhance edge sharpness in the output image, or decreased to reduce edge sharpness. The sixth embodiment can be used to control edge sharpness in this way even when the basic zoom ratio (n) is equal to unity.

In the description above, the product of the first derivative, the third derivative, and the parameter k was simply added to the basic zoom ratio n, but more complex schemes are possible. For example, a positive upper limit and a negative lower limit may be placed on the product, or a non-linear function may be applied as a substitute for multiplication by k.

Figure 30:
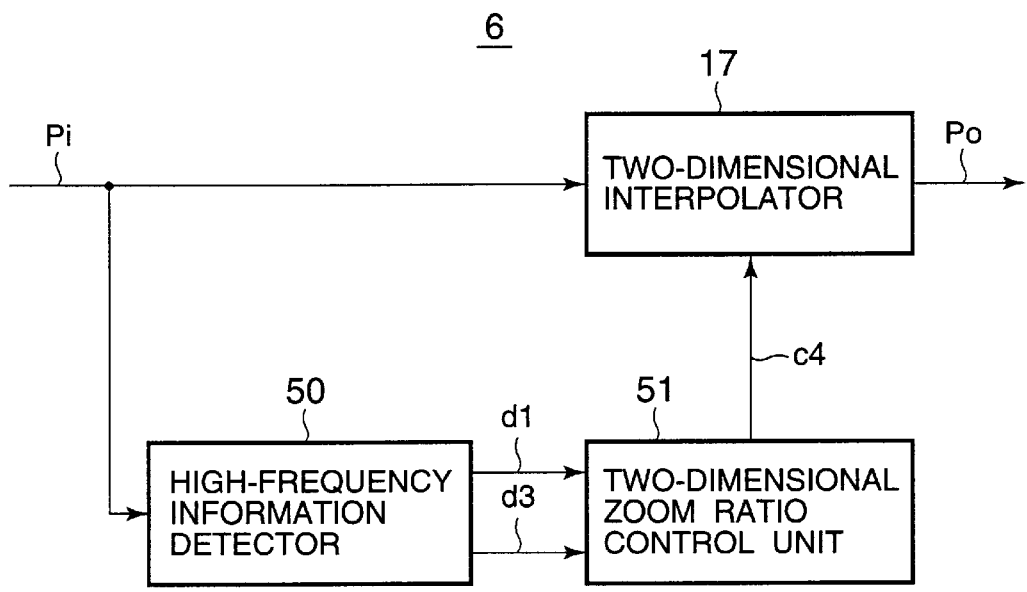
FIG. 30 illustrates the internal structure of the zoom processor in a variation of the sixth embodiment.

Referring to FIG. 30, horizontal zooming and vertical zooming may also be carried out simultaneously in the sixth embodiment. The zoom processor 6 then comprises a two-dimensional interpolator 17, a high-frequency information detector 50, and a two-dimensional zoom ratio control unit 51. The high-frequency information detector 50 detects horizontal and vertical variations in the input image data and calculates a two-dimensional first derivative d1 and third derivative d3. The two-dimensional zoom ratio control unit 51 calculates a two-dimensional zoom ratio c4 from these derivatives d1 and d3. The two-dimensional interpolator 17 uses the two-dimensional zoom ratio c4 for two-dimensional (horizontal and vertical) interpolation. Further details will be given in the tenth embodiment.

Figure 31:
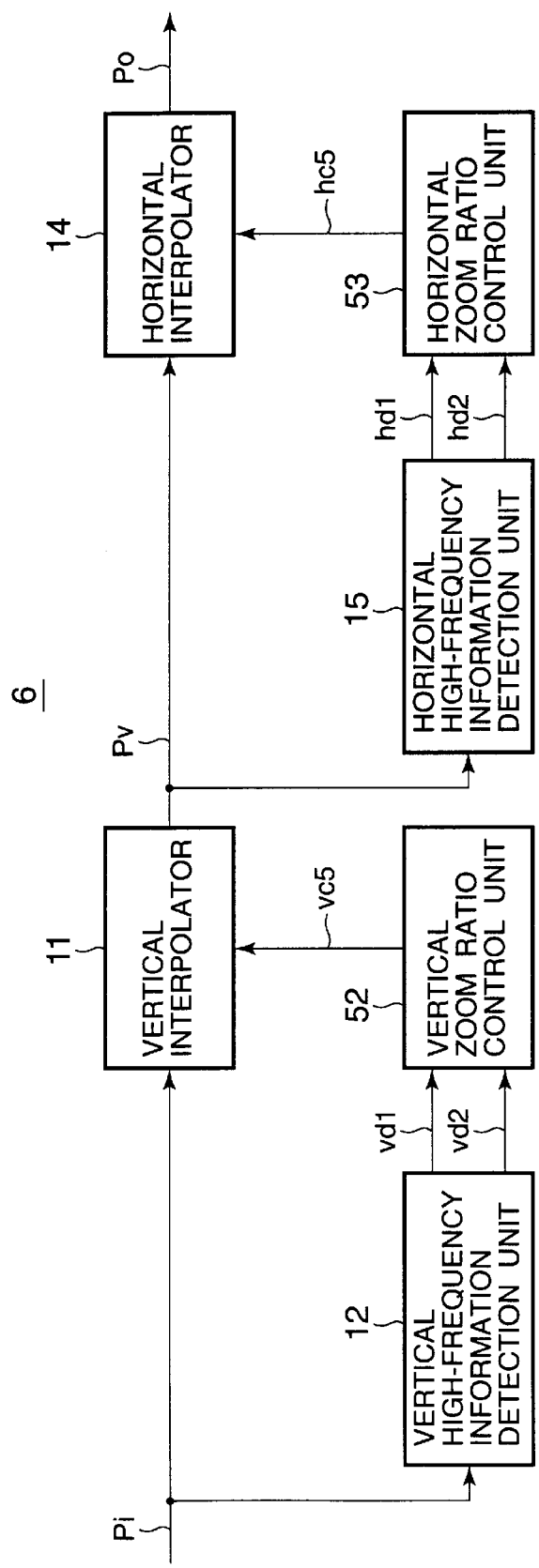
FIG. 31 illustrates the internal structure of the zoom processor in the seventh embodiment.

FIG. 31 shows the internal configuration of the zoom processor 6 in the seventh embodiment of the invention. The vertical interpolator 11, vertical high-frequency information detector 12, horizontal interpolator 14, and horizontal high-frequency information detector 15 are similar to the corresponding elements in the first embodiment. The vertical zoom ratio control unit 52 operates on the vertical first derivative vd1 and second derivative vd2 output by the vertical high-frequency information detector 12 to generate a vertical zoom ratio vc5. The horizontal zoom ratio control unit 53 operates on the horizontal first derivative hd1 and second derivative hd2 output by the vertical high-frequency information detector 12 to generate a horizontal zoom ratio hc5.

Figure 32:
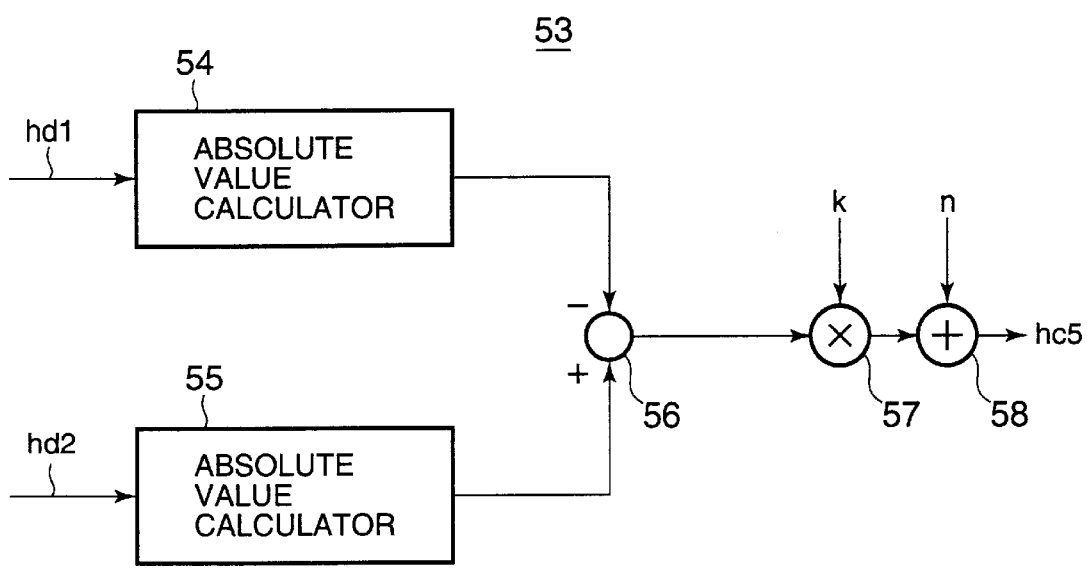
FIG. 32 illustrates the internal structure of the horizontal zoom ratio control unit in FIG. 31.

The horizontal zoom ratio control unit 53 has the internal structure shown in FIG. 32, comprising a pair of absolute value calculators 54, 55, a subtractor 56, a multiplier 57, and an adder 58. Absolute value calculator 54 takes the absolute value of the horizontal first derivative hd1. Absolute value calculator 55 takes the absolute value of the horizontal second derivative hd2. The subtractor 56 subtracts the absolute value of the horizontal first derivative from the absolute value of the second derivative. The multiplier 57 multiplies the resulting difference by a positive constant parameter k. The adder 58 adds the resulting product to the basic zoom ratio n to obtain the horizontal zoom ratio hc5.

The vertical zoom ratio control unit 52 has a similar internal structure.

Figure 33A:
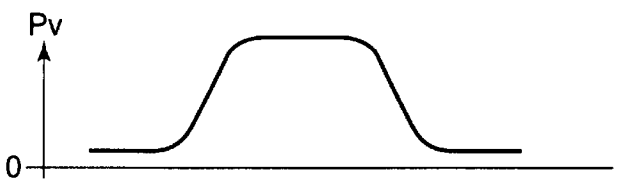
FIGS. 33A, 33B, 33C, 33D, 33E, 33F, and 33G are spatial waveform diagrams illustrating the operation of the seventh embodiment.
Figure 33B:
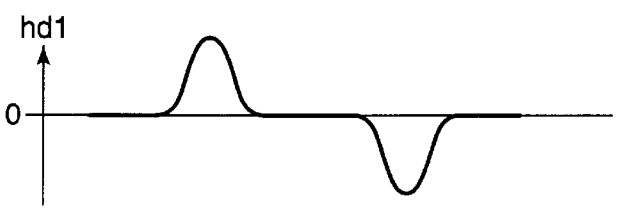
Figure 33C:
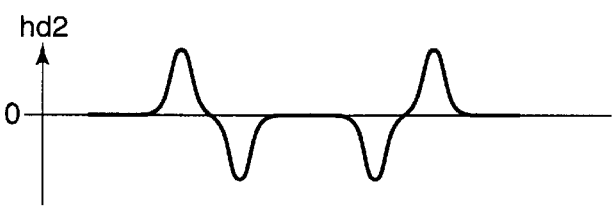
Figure 33D:
Figure 33E:
Figure 33F:
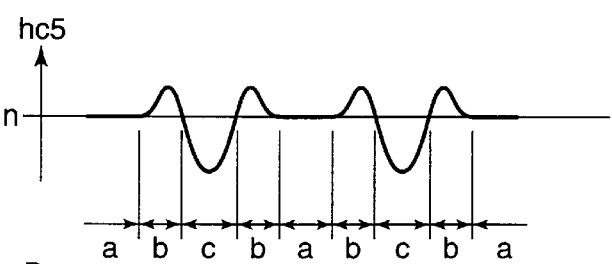

The operation of the seventh embodiment is illustrated in FIGS. 33A to 33G. FIG. 33A shows an example of the brightness levels in a horizontal line in the vertically zoomed image data Pv. FIG. 33B shows the corresponding horizontal first derivative hd1 and FIG. 33C shows the corresponding horizontal second derivative hd2 as output by the vertical high-frequency information detector 12. FIG. 33D shows the absolute value of the horizontal first derivative abs(hd1) as calculated by absolute value calculator 54. FIG. 33E shows the absolute value of the horizontal second derivative abs(hd2) as calculated by absolute value calculator 55. FIG. 33F shows the horizontal zoom ratio hc5, which is calculated from these absolute values by the following equation.

$$hc5=n+(k\times((abs(hd2)-abs(hd1)))$$

As can be seen from FIG. 33F, the seventh embodiment has the same general effect as the sixth embodiment, increasing the zoom ratio in leading and trailing edge segments (b) and reducing the zoom ratio in interior edge segments (c), so that the average value of the zoom ratio over the entire horizontal line is equal to the basic zoom ratio (n) used in uniform segments (a).

$$AVE(hc5)=n$$

Figure 33G:
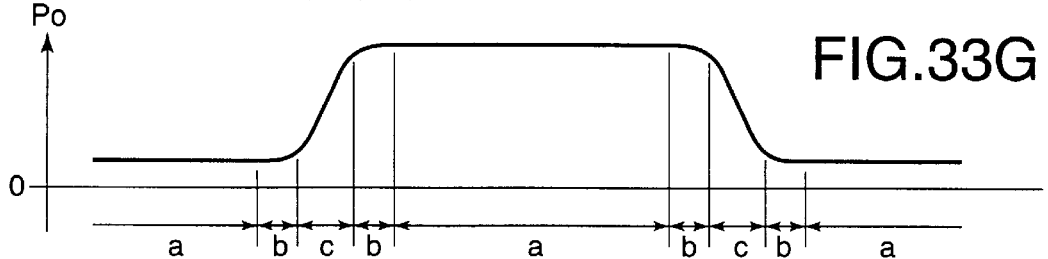

FIG. 33G depicts expanded output image data Po obtained by interpolation with the variable zoom ratio hc5.

Vertical zooming is performed in the same way as horizontal zooming. The horizontal zoom ratio and vertical zoom ratio are mutually independent, and different values of the parameter k may be used in the horizontal and vertical directions.

The third derivatives employed in the sixth embodiment are calculated by differentiating the second derivatives employed in the seventh embodiment. Compared with the sixth embodiment, the seventh embodiment requires one less differentiation operation in each direction, and can accordingly be implemented more simply.

Figure 34:
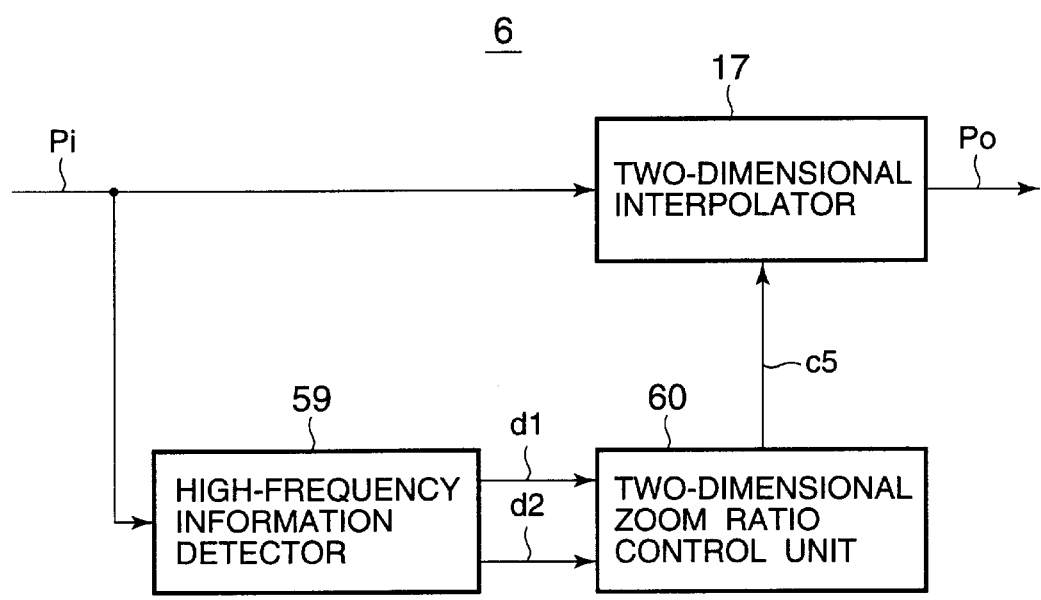
FIG. 34 illustrates the internal structure of the zoom processor in a variation of the seventh embodiment.

Referring to FIG. 34, horizontal zooming and vertical zooming may be carried out simultaneously. The zoom processor 6 then comprises a two-dimensional interpolator 17, a high-frequency information detector 59, and a two-dimensional zoom ratio control unit 60. The high-frequency information detector 59 detects horizontal and vertical variations in the input image data and calculates a two-dimensional first derivative d1 and second derivative d2. The two-dimensional zoom ratio control unit 60 calculates a two-dimensional zoom ratio c5 from these derivatives d1, d2, taking differences between their absolute values as described above. The two-dimensional interpolator 17 uses the two-dimensional zoom ratio c5 for two-dimensional (horizontal and vertical) interpolation. Further information will be given in the description of the tenth embodiment.

Figure 35:
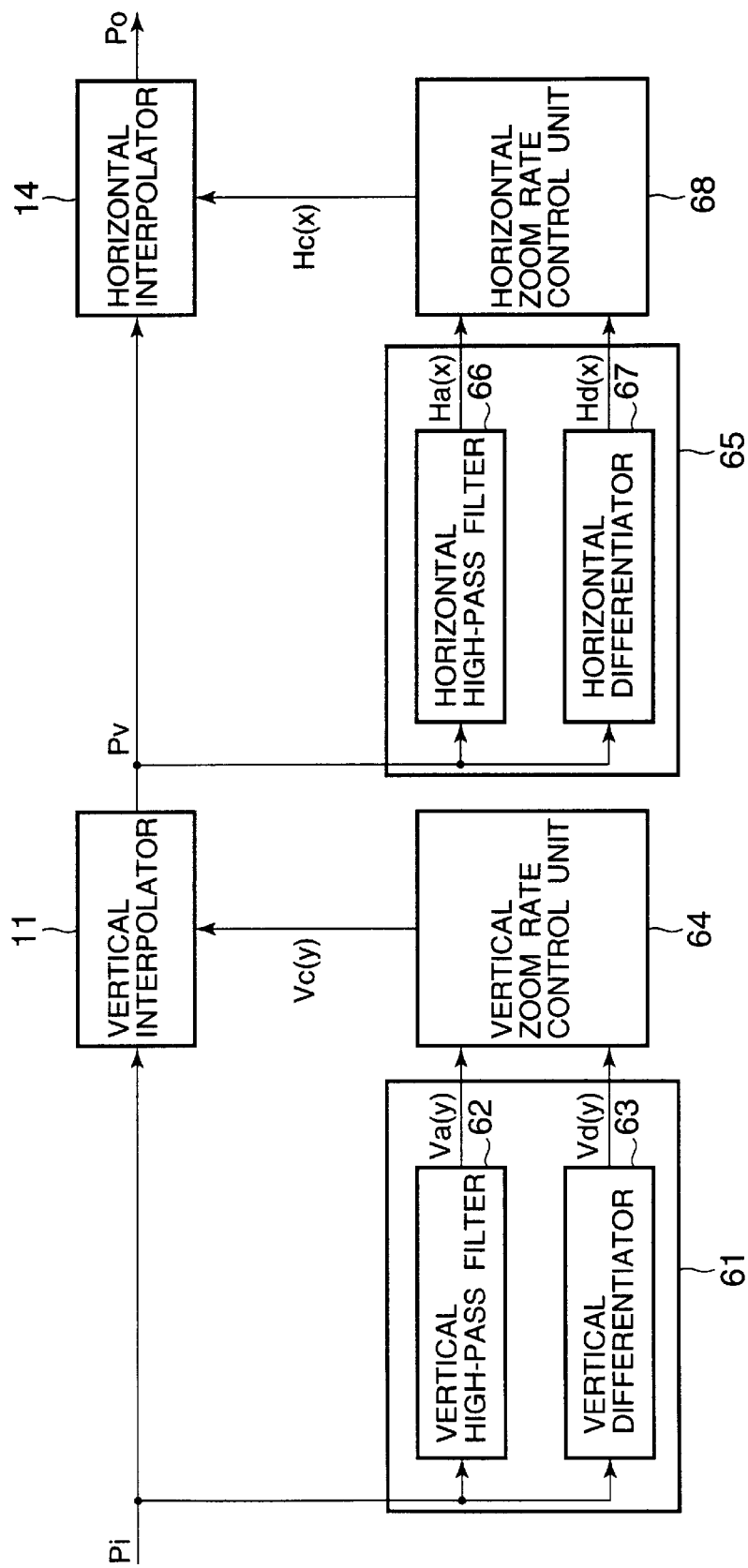
FIG. 35 illustrates the internal structure of the zoom processor in an eighth embodiment of the invention.

FIG. 35 shows the internal configuration of the zoom processor 6 in an eighth embodiment of the invention. The vertical interpolator 11 and horizontal interpolator 14 are similar to the corresponding elements in the first embodiment.

The vertical high-frequency information detector 61 comprises a vertical high-pass spatial filter 62 and a vertical differentiator 63. The vertical high-pass spatial filter 62 extracts high spatial frequencies of the input image data Pi in the vertical direction and generates a vertical high-frequency component of the image data, denoted Va(y). The vertical differentiator 63 takes the first derivative of the input image data Pi in the vertical direction and generates a vertical first derivative, denoted Vd(y). This Vd(y) may be identical to the first derivative denoted vd1 in preceding embodiments, but the notation Vd(y) will be used for consistency with Va(y).

The vertical zoom rate control unit 64 receives the vertical high-frequency image component Va(y) and vertical first derivative Vd(y), and generates a vertical zoom ratio Vc(y). The vertical interpolator 11 expands or reduces the input image Pi vertically according to this zoom ratio Vc(y), to generate vertically zoomed image data Pv.

The horizontal high-frequency information detector 65 comprises a horizontal high-pass spatial filter 66 and a horizontal differentiator 67. The horizontal high-pass spatial filter 66 extracts high spatial frequencies of the vertically zoomed image data Pv in the horizontal direction, and generates a horizontal high-frequency component of the image data, denoted Ha(x). The horizontal differentiator 67 takes the first derivative of vertically zoomed image data Pv in the horizontal direction and generates a horizontal first derivative, denoted Hd(x). This Hd(x) may be identical to the first derivative denoted hd1 in preceding embodiments, but the notation Hd(x) will be used for consistency with Ha(x).

The horizontal zoom rate control unit 68 receives the horizontal high-frequency image component Ha(x) and horizontal first derivative Hd(x), and generates a horizontal zoom ratio Hc(x). The horizontal interpolator 14 expands or reduces the vertically zoomed image data Pv horizontally according to this zoom ratio Hc(x), to generate output image data Po.

FIGS. 36A to 36E illustrate the operation of the eighth embodiment. More specifically, they illustrate the horizontal zooming operation. The horizontal axis in these drawings indicates pixel position in a horizontal scanning line in the vertically zoomed image data Pv.

Figure 36A:
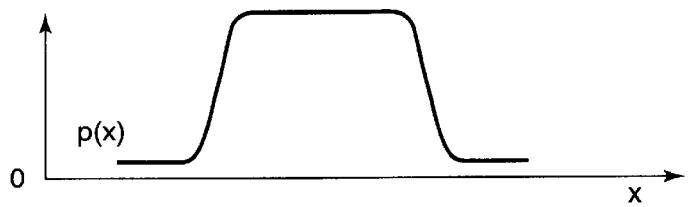
FIGS. 36A, 36B, 36C, 36D, and 36E are spatial waveform diagrams illustrating the operation of the eighth embodiment.
Figure 36B:
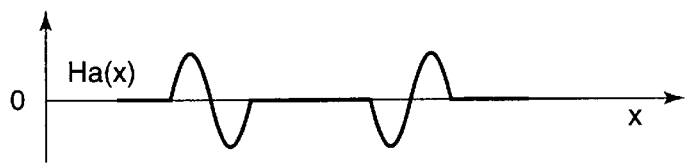
Figure 36C:
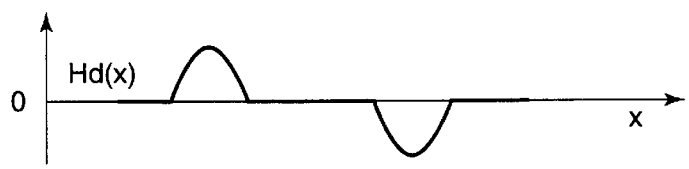
Figure 36D:
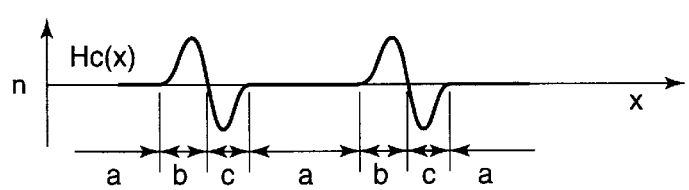

FIG. 36A illustrates the input values p(x) in the horizontal scanning line. FIG. 36B illustrates the corresponding horizontal high-frequency image component Ha(x) extracted by the horizontal high-pass spatial filter 66. FIG. 36C illustrates the horizontal first derivative Hd(x) obtained by the horizontal differentiator 67. FIG. 36D illustrates the horizontal zoom ratio Hc(x) output by the horizontal zoom rate control unit 68. The horizontal zoom rate control unit 68 calculates the horizontal zoom ratio according to the following equation, in which n is the basic zoom ratio and k is a positive constant parameter that controls edge sharpness.

$$Hc(x)=n+(k \times Ha(x) \times Hd(x))$$

As FIG. 36D shows, the horizontal zoom ratio Hc(x) is equal to n in segments (a) in which the pixel value does not change, is greater than n in leading edge segments (b), and is less than n in trailing edge segments (c). Furthermore, the average value of the zoom ratio Hc(x) over the entire horizontal line is equal to the basic zoom ratio n.

Figure 36E:
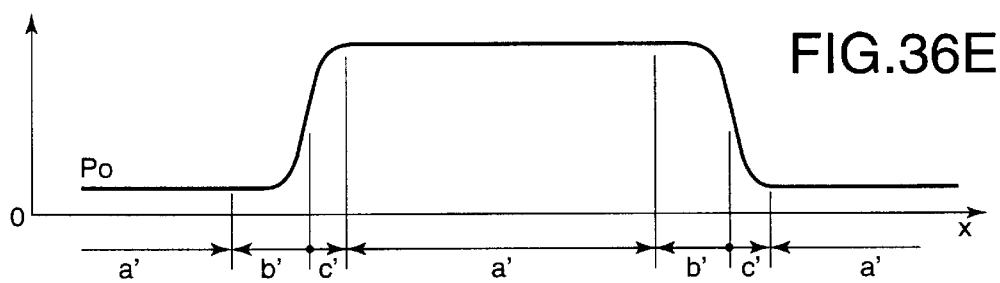

FIG. 36E illustrates expanded image data Po obtained by interpolation with the variable zoom ratio Hc(x). The interpolation operation generates new uniform segments (a') expanded by the basic zoom ratio n, new leading edge segments (b') expanded by a ratio greater than n, and new trailing edge segments (c') expanded by a ratio less than n.

Figure 37:
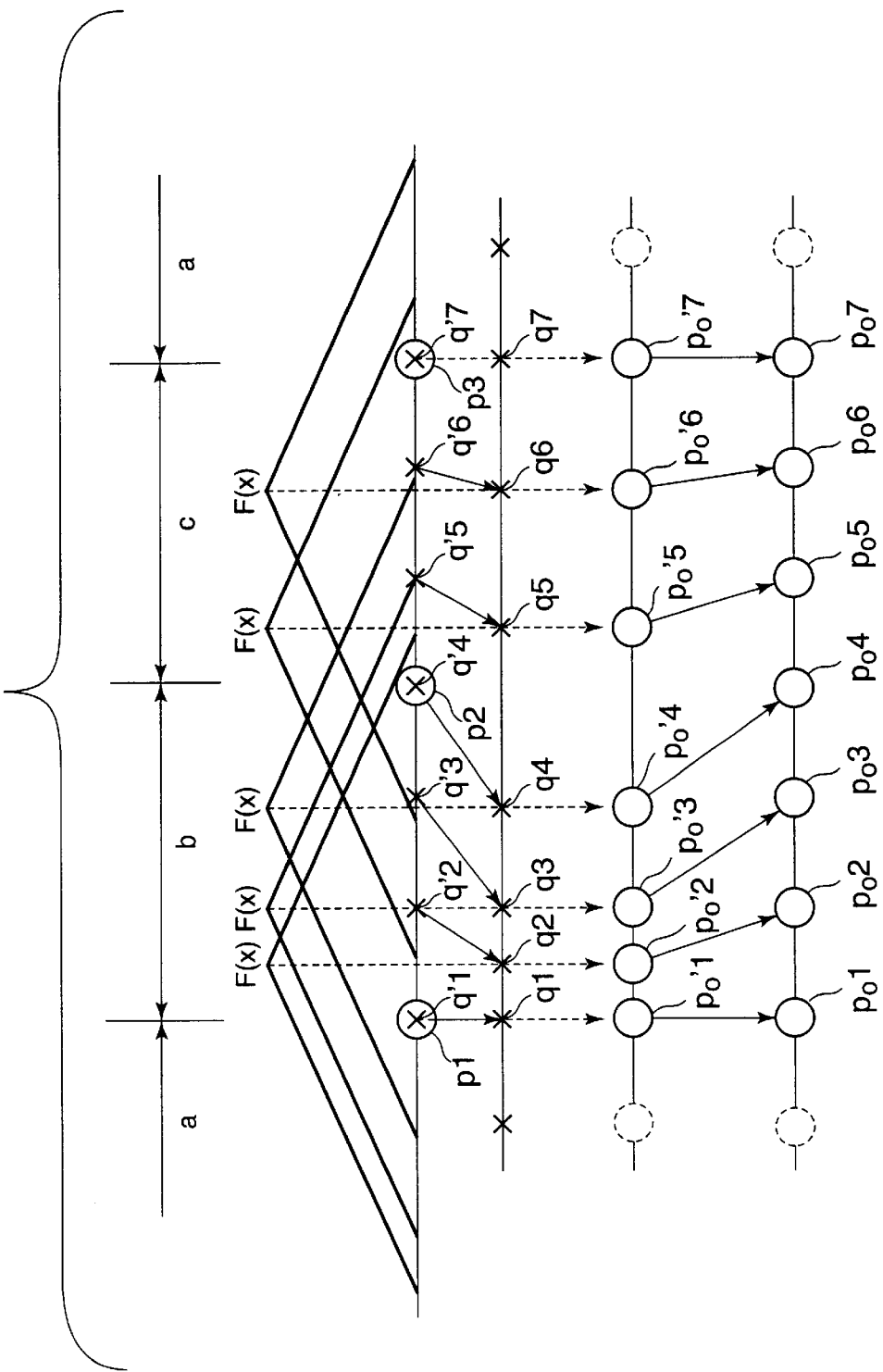
FIG. 37 illustrates interpolation in the eighth embodiment at a three-pixel edge.

FIG. 37 illustrates the generation of output image data at an edge comprising three pixels (p1, p2, p3) in the image data Pv, when the basic zoom ratio (n) is three. New image data are generated at seven interpolation points (q1 to q7) using the type of linear filter response characteristic F(x) illustrated in FIG. 2. The equally spaced interpolation points q'1 to q'7 at which new image data would be generated in conventional image expansion are also shown. Thus the distance from q'1 to q'2, for example, is one-third the distance from p1 to p2.

As explained in the first embodiment, the zoom ratio Hc(x) is calculated at the equally spaced interpolation points (q'1 to q'7), the reciprocal values of the calculated zoom ratios are taken, and the reciprocal values are cumulatively summed to determine the interpolation points (q1 to q7) at which the new pixels will be generated. The new pixels generated at points q1 to q7 are denoted $p_o$'1 to $p_o$'7. The pixel values are calculated by interpolation from the input data p(x), using the filter response characteristics F(x). When displayed, these pixels are evenly spaced, as indicated by $p_o$1 to $p_o$7 at the bottom of FIG. 37. As a result, the leading edge segment (b) is expanded more than the trailing edge segment (c).

Vertical zooming in the eighth embodiment is carried out in substantially the same way as horizontal zooming. The vertical zoom ratio Vc(y) is calculated according to the following equation.

$$Vc(y)=n+(k \times Va(y) \times Vd(y))$$

As can be seen by comparing FIG. 37 with FIG. 11, the eighth embodiment provides generally the same effect as the first embodiment, but to the extent that the high-frequency image data Ha(x) differs from the second derivative hd2, the positions at which new pixels are generated in the eighth embodiment differ from the positions at which new pixels are generated in the first embodiment. For example, $p_o$'1, $p_o$'2, and $p_o$'3 in FIG. 37 are more closely spaced than q11, q12, and q13 in FIG. 11.

As in the first embodiment, the parameter k can be used to control edge sharpness in the output image even when the basic zoom ratio (n) is equal to unity. The values of n and k used in horizontal zooming may be independent of the value of n and k used in vertical zooming.

Figure 38:
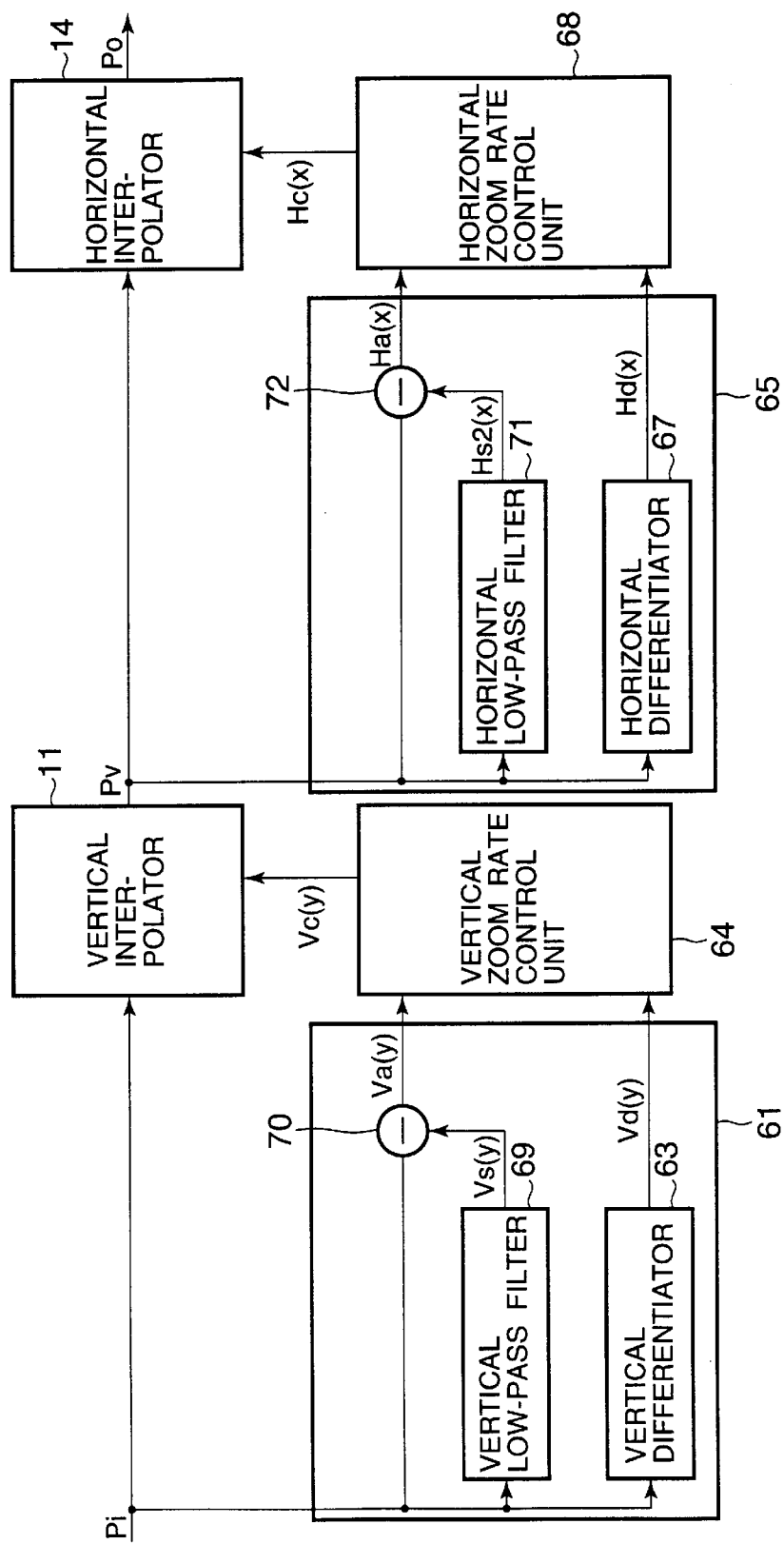
FIG. 38 illustrates the internal structure of the zoom processor in a variation of the eighth embodiment.

In a variation of the eighth embodiment, the zoom processor 6 has the structure shown in FIG. 38. The vertical high-frequency information detector 61 comprises the vertical differentiator 63 described above, a vertical low-pass spatial filter 69, and a subtractor 70. The vertical low-pass spatial filter 69 generates vertical low-frequency image data Vs (y). The subtractor 70 takes the difference between the input image data Pi and the vertical low-frequency image data Vs(y), thereby generating vertical high-frequency image data Va(y) for supply to the vertical zoom rate control unit 64. Similarly, the horizontal high-frequency information detector 65 comprises the horizontal differentiator 67 described above, a horizontal low-pass spatial filter 71, and a subtractor 72. The horizontal low-pass spatial filter 71 generates horizontal low-frequency image data Hs (x). The subtractor 72 takes the difference between the vertically zoomed image data Pv and the horizontal low-frequency image data Hs(x), thereby generating horizontal high-frequency image data Ha(x) for supply to the horizontal zoom rate control unit 68. This variation generates the same output data Po as the structure shown in FIG. 35.

Figure 39:
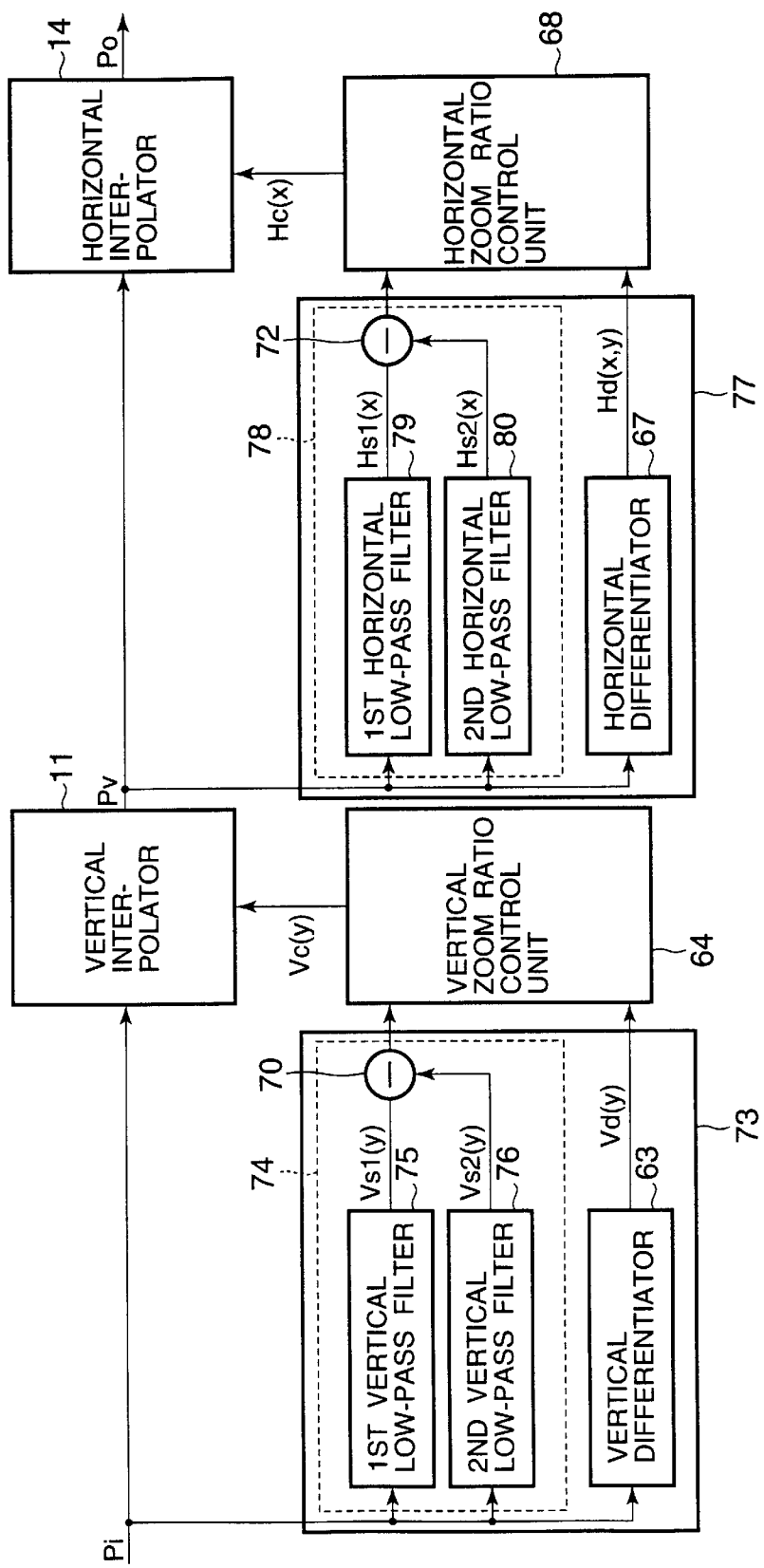
FIG. 39 illustrates the internal structure of the zoom processor in a ninth embodiment of the invention.

FIG. 39 illustrates the structure of the zoom processor 6 in a ninth embodiment of the invention. The vertical interpolator 11, horizontal interpolator 14, vertical zoom rate control unit 64, and horizontal zoom rate control unit 68 are similar to the corresponding elements in the eighth embodiment.

The vertical high-frequency information detector 73 in the ninth embodiment comprises a vertical differentiator 63 and a vertical bandpass spatial filter 73. The vertical bandpass spatial filter 73 comprises a subtractor 70 and a pair of vertical low-pass spatial filters 75, 76. The vertical low-pass spatial filters 75, 76 extract low spatial frequencies in the vertical direction but operate with different spatial cut-off frequencies, the cut-off frequency of the first vertical low-pass spatial filter 75 being lower than the cut-off frequency of the second vertical low-pass spatial filter 76. The subtractor 70 subtracts the low-frequency image data Vs2(y) output by the second vertical low-pass spatial filter 76 from the low-frequency image data Vs1(y) output by the first vertical low-pass spatial filter 75, and supplies the resulting difference to the vertical zoom rate control unit 64. The vertical zoom rate control unit 64 uses this difference in the same way as the high-frequency image data Ha(y) received in the ninth embodiment.

Similarly, the horizontal high-frequency information detector 77 comprises a horizontal differentiator 67 and a horizontal bandpass spatial filter 78. The horizontal bandpass spatial filter 78 comprises a subtractor 72 and a pair of horizontal low-pass spatial filters 79, 80. The horizontal low-pass spatial filters 79, 80 extract low spatial frequencies in the horizontal direction but operate with different cut-off frequencies, the cut-off frequency of the first horizontal low-pass spatial filter 79 being lower than the cut-off frequency of the second horizontal low-pass spatial filter 80. The subtractor 70 subtracts the low-frequency image data Vs2(y) output by the second horizontal low-pass spatial filter 80 from the low-frequency image data Vs1(y) output by the first horizontal low-pass spatial filter 79, and supplies the resulting difference to the horizontal zoom rate control unit 68. The horizontal zoom rate control unit 68 uses this difference in the same way as the high-frequency image data Ha(x) received in the ninth embodiment.

FIGS. 40A to 40G illustrate the operation of the ninth embodiment by illustrating the horizontal zooming operation. The horizontal axis in these drawings indicates pixel position in a horizontal scanning line in the vertically zoomed image data Pv.

Figure 40A:
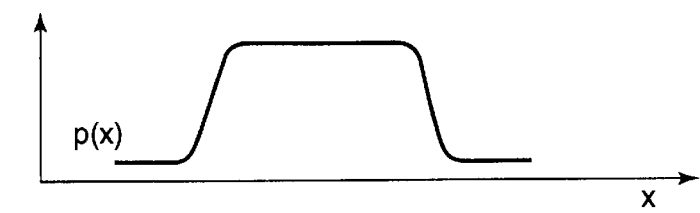
FIGS. 40A, 40B, 40C, 40D, 40E, 40F, and 40G are spatial waveform diagrams illustrating the operation of the ninth embodiment.
Figure 40B:
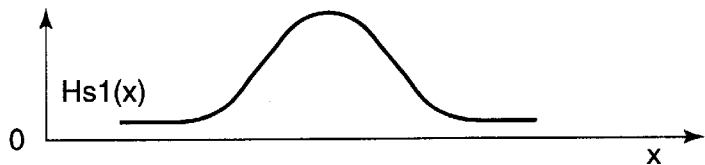
Figure 40C:
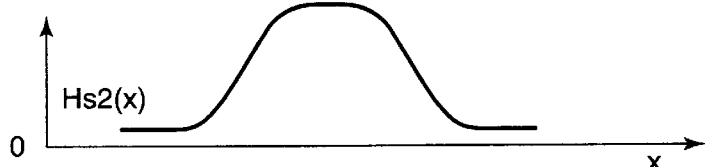
Figure 40D:
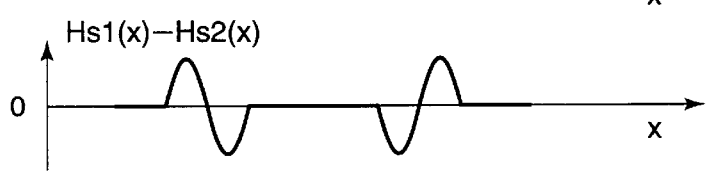
Figure 40E:
Figure 40F:
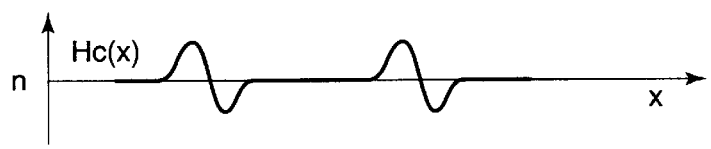

FIG. 40A illustrates the input values p(x) in this horizontal scanning line. FIG. 40B illustrates the corresponding low-frequency data Hs1(x) output by the first horizontal low-pass spatial filter 79. FIG. 40C illustrates the corresponding low-frequency data Hs2(x) output by the second horizontal low-pass spatial filter 80. FIG. 40D illustrates the difference Hs1(x)−Hs2(x) obtained by the subtractor 72. FIG. 40E illustrates the first derivative Hd(x) obtained by the horizontal differentiator 67. FIG. 40F illustrates the zoom ratio Hc(x) output by the horizontal zoom rate control unit 68. The horizontal zoom rate control unit 68 calculates the zoom ratio according to the following equation, in which n is the basic zoom ratio and k is a constant parameter that controls edge sharpness.

$$Hc(x)=n+(k\times(Hs1(x)-Hs2(x))\times Hd(x))$$

As FIG. 40F shows, the zoom ratio Hc(x) has the same general form as in the eighth embodiment, being equal to n in segments in which the pixel value does not change, greater than n in leading edge segments, and less than n in trailing edge segments, and having an average value equal to n over the entire horizontal scanning line.

Figure 40G:
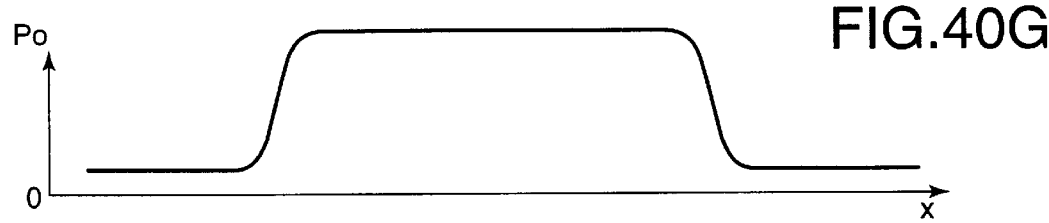

FIG. 40G illustrates expanded image data Po obtained by interpolation with the variable zoom ratio Hc(x). The result of interpolation is generally the same as in the eighth embodiment. However, the cut-off frequencies of the first and second horizontal low-pass spatial filters 79, 80 can be set to emphasize a particular range of spatial frequency components at edges in the image.

Vertical zooming is carried out in the ninth embodiment in the same way as horizontal zooming. The vertical zooming parameters (n, k, and the cut-off frequencies of the vertical low-pass spatial filters 75, 76) may differ from the horizontal zooming parameters (n, k, and the cut-off frequencies of the horizontal low-pass spatial filters 79, 80).

Figure 41:
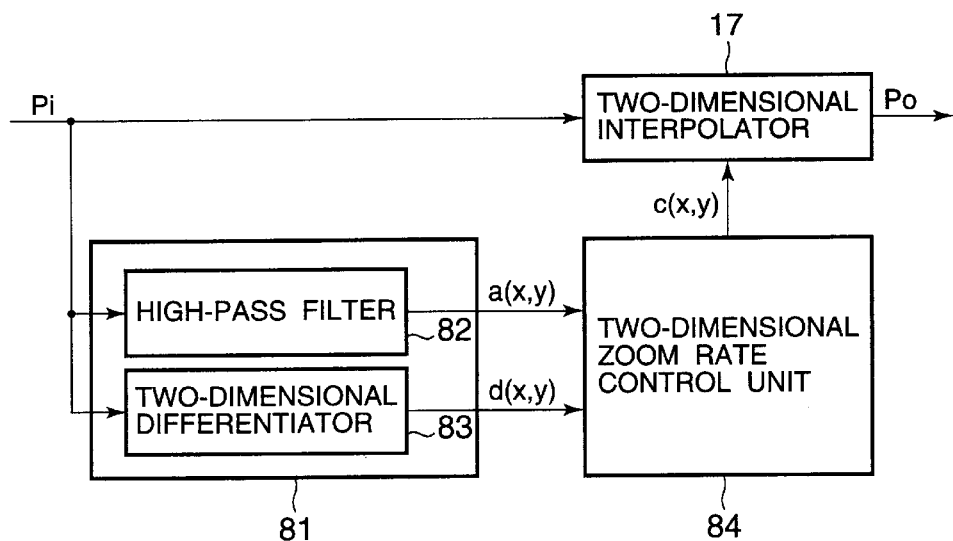
FIG. 41 illustrates the internal structure of the zoom processor in a tenth embodiment of the invention.

FIG. 41 shows the structure of the zoom processor 6 in a tenth embodiment of the invention, in which horizontal and vertical interpolation are performed simultaneously. This zoom processor 6 comprises a two-dimensional interpolator 17 as described earlier, a high-frequency information detector 81 including a high-pass spatial filter 82 and a two-dimensional differentiator 83, and a two-dimensional zoom rate control unit 84.

The high-pass spatial filter 82 generates high-frequency image data a(x, y) by performing filtering computations at equally spaced interpolation points q'nm. These computations are carried out on input pixels that are horizontally, vertically, and diagonally near to the interpolation points q'nm in the input image data Pi. The two-dimensional differentiator 83 generates first-derivative data d(x, y) at the equally spaced interpolation points q'nm, again using data (Pi) for input pixels that are horizontally, vertically, and diagonally nearby. The two-dimensional zoom rate control unit 84 generates a zoom ratio c(x, y) for each of the equally spaced interpolation points q'nm from the high-frequency image data a(x, y) and first-derivative data d(x, y). The zoom ratio c(x, y) is calculated according to the following equation.

$$c(x,y)=n+(k\times a(x,y)\times d(x,y))$$

Figure 42:
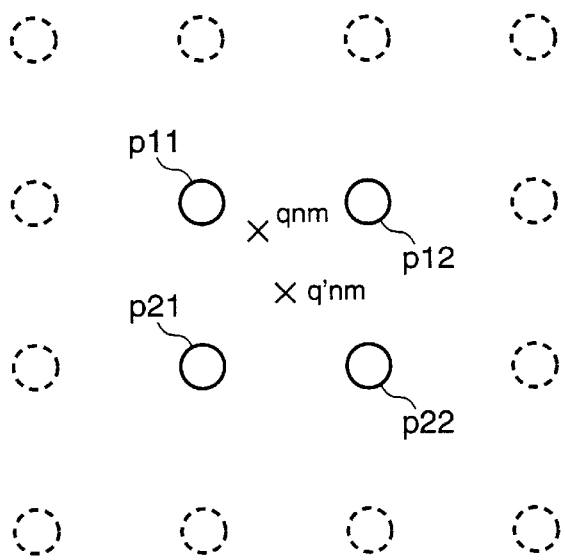
FIG. 42 illustrates the location of an interpolation point in the tenth embodiment.

The first derivative d(x, y) and zoom ratio c(x, y) are two-dimensional quantities with horizontal and vertical components. The two-dimensional interpolator 17 uses the zoom ratios c(x, y) at the equally spaced interpolation points q'nm to determine the interpolation points qnm at which new image data will be generated. FIG. 42 shows an example in which an equally spaced interpolation point q'nm is disposed at the center of a square formed by four pixels (p11, p12, p21, p22) in the input image data Pi, and the corresponding interpolation point qnm determined from the zoom ratios is disposed closer to pixel p11. The two-dimensional interpolator 17 generates interpolation filtering coefficients for this point qnm, or obtains the necessary coefficients from a look-up table, and performs an interpolation calculation by applying these coefficients to the input pixels (p11, p12, p21, p22, in this case) closest to interpolation point qnm.

Figure 43:
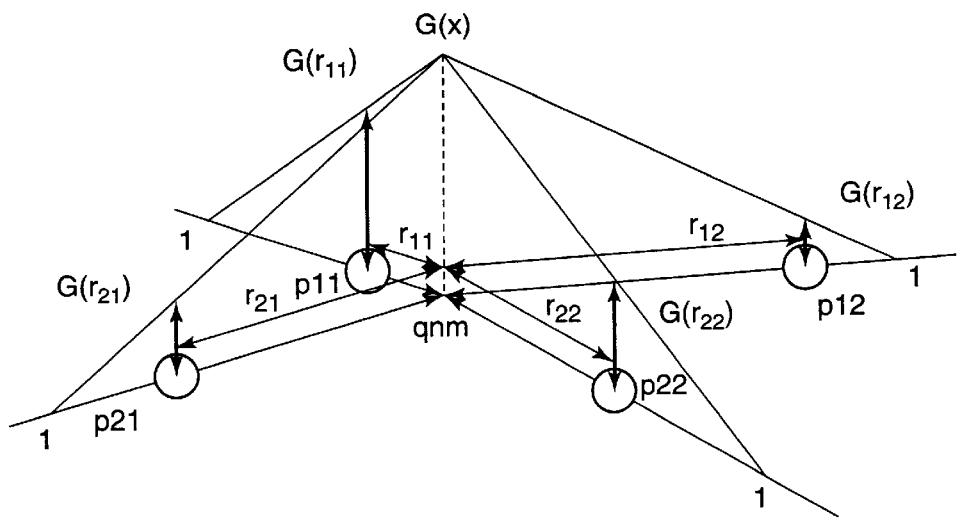
FIG. 43 illustrates interpolation at the interpolation point in FIG. 42.

The calculation is explained in FIG. 43. G(x) is the filter response characteristic from which the interpolation coefficients are obtained. The distance between diagonally opposite pairs of input pixels is assumed to be unity. If the distances from the point qnm at which the new image data will be generated to the four pixels p11, p12, p21, p22, are $r_{11}, r_{12}, r_{21}, r_{22}$, respectively, then the interpolated data value po'nm is calculated as follows.

$$po'nm = G(r_{11})p11 + G(r_{12})p12 + G(r_{21})p21 + G(r_{22})p22$$

In the tenth embodiment, the accuracy of the interpolation calculation is enhanced because each interpolated value is obtained from the values of at least four of the pixels closest, in a two-dimensional sense, to the interpolation point qnm.

Figure 44:
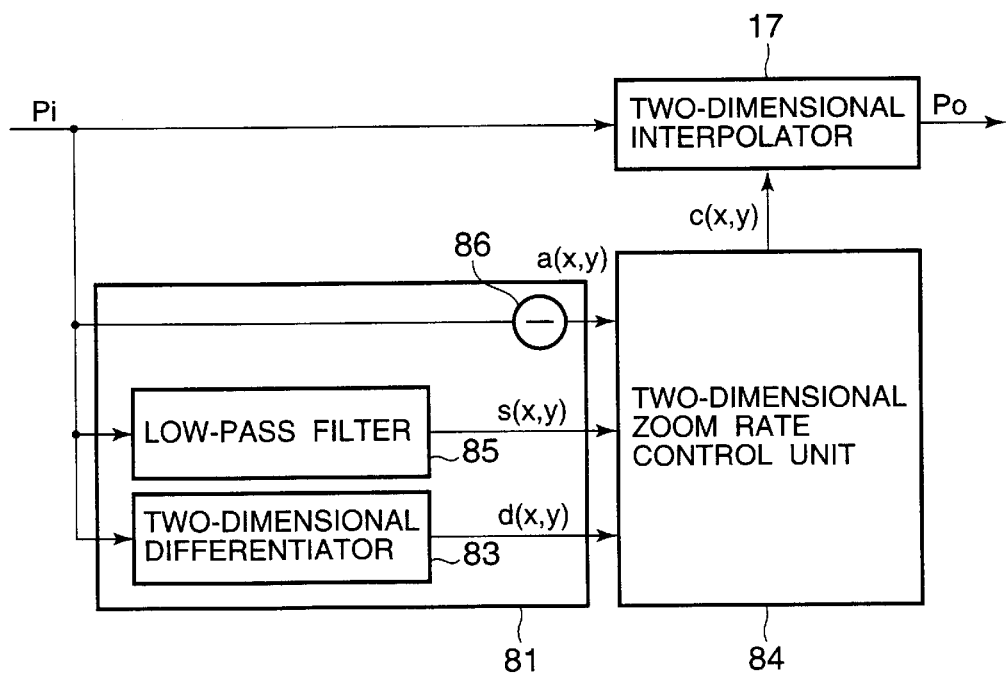
FIG. 44 illustrates the internal structure of the zoom processor in a variation of the tenth embodiment.

In a variation of the tenth embodiment, shown in FIG. 44, the high-frequency information detector 81 comprises a two-dimensional differentiator 83, a low-pass spatial filter 85, and a subtractor 86. The low-pass spatial filter 85 receives the input image data Pi and generates low-frequency image data s(x, y) at equally spaced interpolation points. The subtractor 86 takes the difference between the input image data Pi and the low-frequency image data s(x, y), thereby generating the high-frequency image data a(x, y) that is supplied to the two-dimensional zoom rate control unit 84. At equally spaced interpolation points not coinciding with input pixels, the subtractor 86 takes the difference between s(x, y) and image data obtained from the input image data Pi by, for example, linear interpolation.

Figure 45:
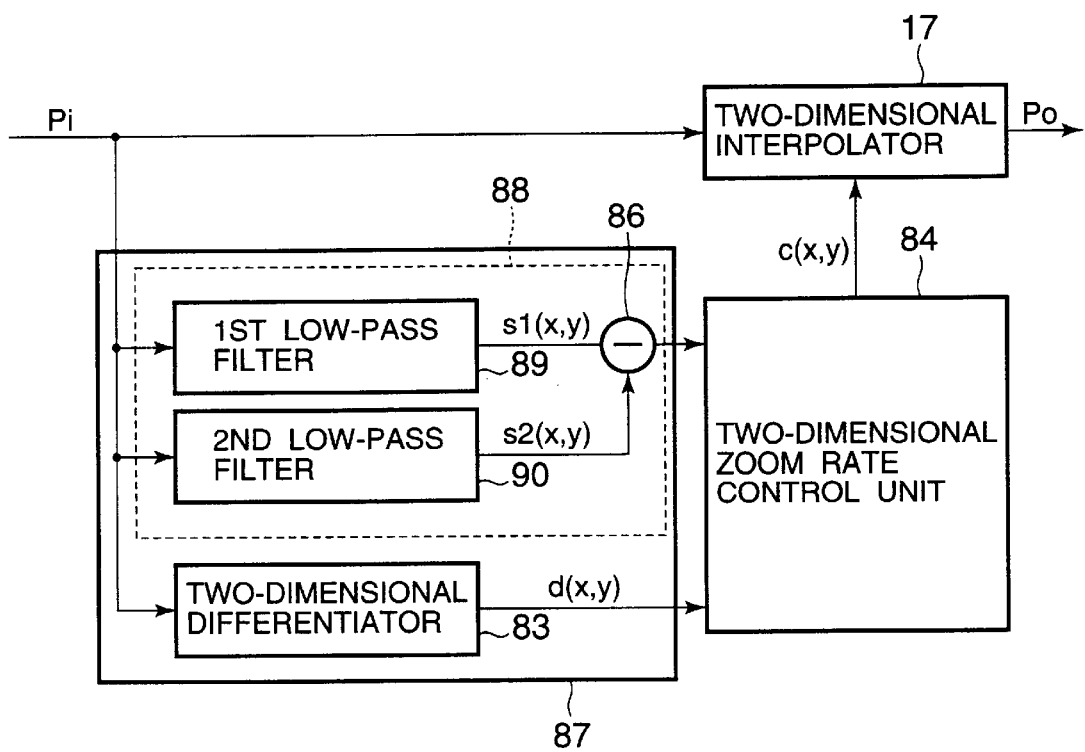
FIG. 45 illustrates the internal structure of the zoom processor in another variation of the tenth embodiment.

In another variation of the tenth embodiment, shown in FIG. 45, the high-frequency information detector 87 comprises a two-dimensional differentiator 83 and a bandpass spatial filter 88. The bandpass spatial filter 88 comprises a subtractor 86 and a pair of low-pass spatial filters 89, 90. The two low-pass spatial filters 89, 90 both extract low-frequency data from the input image data Pi, but operate with different cut-off frequencies, the cut-off frequency of the first low-pass spatial filter 89 being lower than the cut-off frequency of the second low-pass spatial filter 90. The subtractor 86 subtracts the low-frequency image data s2(x, y) output by the second low-pass spatial filter 90 from the low-frequency image data s1(x, y) output by the first low-pass spatial filter 89, and supplies the resulting difference to the two-dimensional zoom rate control unit 84. The vertical zoom rate control unit 84 uses this difference as the two-dimensional high-frequency image data a(x, y).

Figure 46:
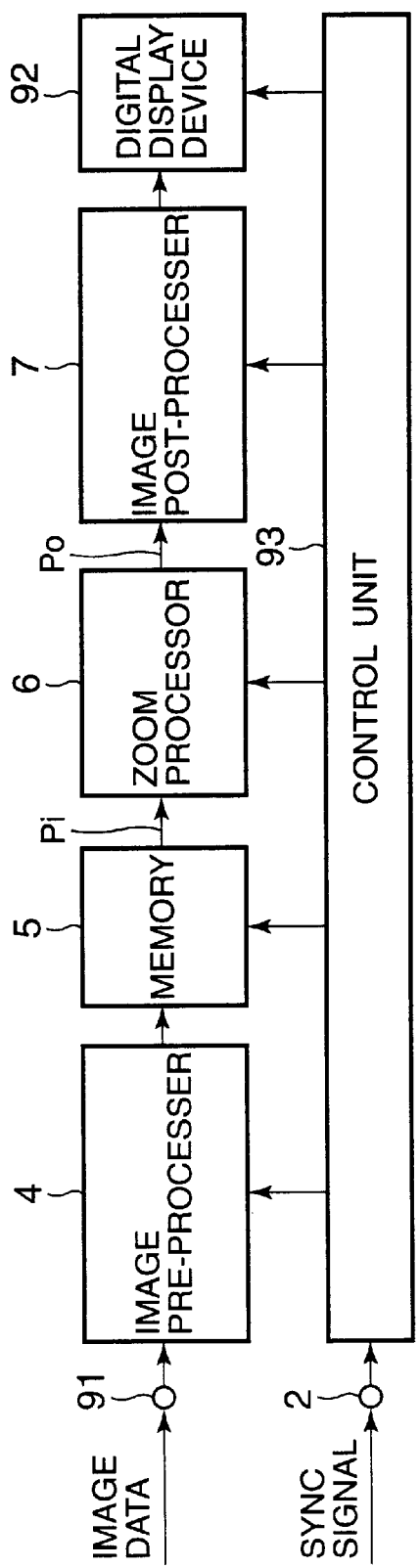
FIG. 46 is a block diagram illustrating an image display apparatus according to an eleventh embodiment of the invention.

The invention can also be practiced when the input and output image signals are digital signals rather than analog signals. As an eleventh embodiment of the invention, FIG. 46 shows an image display apparatus having an input terminal 91 for a digital image signal, that is, for digital image data, and a digital display device 92. The apparatus also has an input terminal 2 for a synchronization signal, an image pre-processor 4, a memory 5, and an image post-processor 7 as described earlier, and a zoom processor 6 as described in any of the preceding embodiments. The image pre-processor 4 receives image data directly from input terminal 91. If the image data are received in a coded form, the image pre-processor 4 decodes the data. The digital display device 92 receives image data directly from the image post-processor 7. A control unit 93 receives the synchronization signal from input terminal 2, and controls the digital display device 92 and other elements by generating the necessary clock, timing, and control signals.

The operation of the eleventh embodiment can be understood from the description of the operation of the preceding embodiments, so further details will be omitted.

In a variation of the eleventh embodiment, an analog display device 9 and a digital-to-analog converter 8 are used as in FIG. 6.

Figure 47:
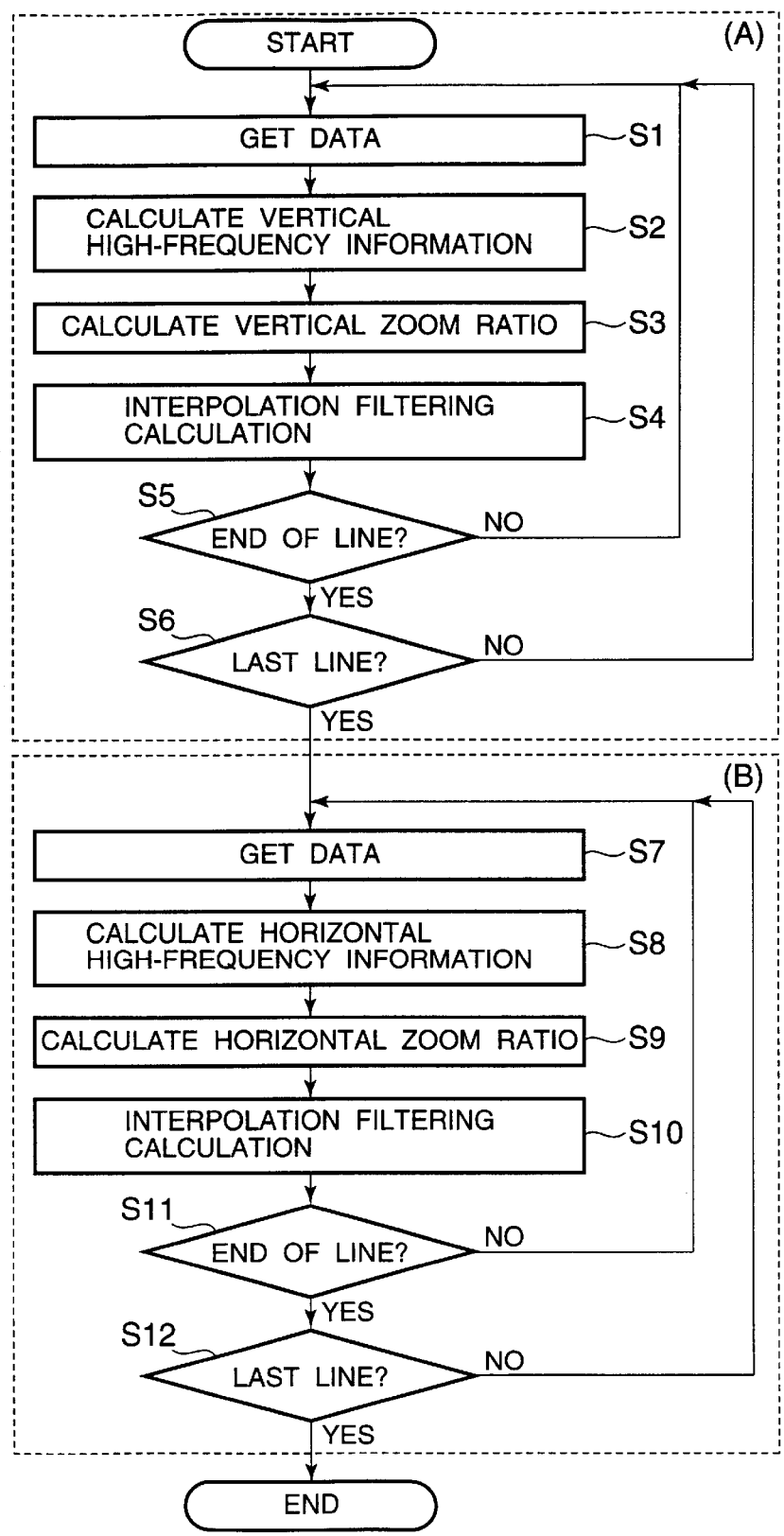
FIG. 47 is a flowchart illustrating the operation of a twelfth embodiment of the invention.

The invention can also be practiced in software, using a general-purpose computer, for example, or a computing device embedded in an image display apparatus, instead of specialized arithmetic and logic circuits. As a twelfth embodiment, FIG. 47 shows a flowchart illustrating the operation of a program that executes the functions of the zoom processor 6 in any one of the first nine embodiments.

The program is divided into a first part (A) that performs vertical zooming, and a second part (B) that performs horizontal zooming. Both parts scan the image in the usual scanning sequence, from left to right and from top to bottom.

The first step (S1) in part A is to obtain the data needed for calculating vertical high-frequency information at the current scanning point of the image. The necessary data include the values of two or more vertically adjacent pixels in the input image data (Pi), which are read from a memory such as the memory 5 in FIG. 46.

Vertical high-frequency information is calculated in the next step (S2), which detects pixel level variations in the vertical direction. Examples of the types of high-frequency information that may be obtained include a first derivative (vd1), second derivative (vd2), third derivative (vd3), vertical variation pattern information (vp1), high-frequency image data (Va(y)), and a difference between two low-frequency components (Vs1(y)−Vs2(y)), as described in the preceding embodiments.

A vertical zoom ratio (vc1) is then calculated from the vertical high-frequency information and the basic vertical zoom ratio (n), as described in any of the first nine embodiments (step S3), and vertical interpolation filtering calculations are performed according to the calculated vertical zoom ratio to generate vertically zoomed image data Pv (step S4). The vertically zoomed image data Pv are stored temporarily in, for example, the memory 5, or another memory not shown in the preceding drawings.

The above process is repeated (step S5) until the end of the current scanning line is reached; then the next scanning line is processed in the same way (step S6). When the last scanning line has been processed, part A of the program ends and part B begins.

The first step (S7) in part B is to obtain the data needed for calculating horizontal high-frequency information at the current scanning point of the image. The necessary data include the values of two or more horizontally adjacent pixels in the image data (Pv) generated in part A.

Horizontal high-frequency information is calculated in the next step (S8), which detects pixel level variations in the horizontal direction. Examples of the types of high-frequency information that may be obtained include a first derivative (hd1), second derivative (hd2), third derivative (hd3), horizontal variation pattern information (hp1), high-frequency image data (Ha(x)), and a difference between two low-frequency components (Hs1($x$)–Hs2($x$)), as described in the preceding embodiments. A horizontal zoom ratio (hc1) is then calculated from the horizontal high-frequency information and the basic horizontal zoom ratio, as described in any of the preceding embodiments (step S9), and horizontal interpolation filtering calculations are performed according to the calculated horizontal zoom ratio to generate new image data Po for output to the image post-processor 7 (step S10). These steps are repeated (step S11) until the end of the current scanning line is reached; then the next scanning line is processed in the same way until the last line has been processed (step S12) and the program ends.

In a variation of the twelfth embodiment, horizontal zooming is performed before vertical zooming. That is, the order of parts A and B of the program are interchanged. One part of the program, either part A or part B, may also be omitted, if zooming is necessary in only one direction.

In another variation of the twelfth embodiment, zooming is performed two-dimensionally, as in the tenth embodiment, for example, so that the image has to be scanned and zoomed only once.

It is also possible to vary the scanning sequence by scanning the image from right to left, or from bottom to top.

The basic zoom ratio (n) used in the vertical direction need not be the same as the basic zoom ratio in used in the horizontal direction, but the zoom ratios calculated in steps S3 and S9 should vary in such a way that the correct total number of output pixels is obtained in each vertical column and in each horizontal scanning line.

The computer or computing device that executes the program illustrated in FIG. 47 may also be programmed to carry out the functions of the image pre-processor 4 and image post-processor 7 in FIG. 46.

In all of the preceding embodiments, the terms leading edge segment and trailing edge segment merely denote two opposite parts of a portion of the image in which the pixel level varies. It is not necessary for the leading edge segment to be disposed to the left of the trailing edge segment, or above it, or to precede it in the scanning sequence.

The preceding embodiments have been described as generating a variable zoom ratio with an average value equal to the basic zoom ratio (n), but this condition can be modified to make the average spacing between interpolation points equal to the basic spacing used in uniform segments, or to make the average value of the reciprocal of the zoom ratio equal to the reciprocal of the basic zoom ratio (1/n).

When a color image is processed, the operations described above may be performed separately for each primary color, or separately for the luminance and chrominance components of the image signal.

Those skilled in the art will recognize that further variations are possible within the scope claimed below.

What is claimed is:

1. A method of processing an input image to obtain an output image, the input image being formed from input pixels having brightness levels, the method comprising the steps of:

detecting pixel-to-pixel variations in the brightness levels in at least one direction in the input image, thereby generating high spatial frequency information;

setting interpolation points with spacing varying according to the high spatial frequency information;

generating output pixels from the input pixels by interpolation at the interpolation points;

wherein said detecting includes calculating a first derivative of the brightness levels in said one direction;

performing two low-pass spatial filtering operations, with different cut-off frequencies, to obtain two low spatial frequency components of the image; and taking a difference between said two low spatial frequency components.

* * * * *